US011014184B2

(12) United States Patent
Wang et al.

(10) Patent No.: US 11,014,184 B2
(45) Date of Patent: May 25, 2021

(54) IN-PROCESS WELD MONITORING AND CONTROL

(71) Applicant: Hitachi, Ltd., Tokyo (JP)

(72) Inventors: Jiye Wang, Farmington Hills, MI (US); Wei Yuan, Novi, MI (US)

(73) Assignee: HITACHI, LTD., Tokyo (JP)

( * ) Notice: Subject to any disclaimer, the term of this patent is extended or adjusted under 35 U.S.C. 154(b) by 454 days.

(21) Appl. No.: 15/959,369

(22) Filed: Apr. 23, 2018

(65) Prior Publication Data
US 2019/0321905 A1 Oct. 24, 2019

(51) Int. Cl.
| | |
|---|---|
| B23K 9/00 | (2006.01) |
| B23K 9/095 | (2006.01) |
| B23K 9/29 | (2006.01) |
| B23K 9/12 | (2006.01) |
| B23K 9/167 | (2006.01) |
| B23K 31/12 | (2006.01) |

(52) U.S. Cl.
CPC .......... *B23K 9/0956* (2013.01); *B23K 9/0953* (2013.01); *B23K 9/126* (2013.01); *B23K 9/167* (2013.01); *B23K 9/296* (2013.01); *B23K 31/125* (2013.01)

(58) Field of Classification Search
CPC .... B23K 9/0956; B23K 26/03; B23K 31/125; B23K 9/0216; B23K 9/126; B23K 9/1274; B23K 9/1276; B23K 9/1278; B23K 9/287; B23K 2103/04; B23K 2103/05; B23K 2103/10; B23K 26/032; B23K 26/034; B23K 26/042; B23K 26/123
See application file for complete search history.

(56) References Cited

U.S. PATENT DOCUMENTS

| | | |
|---|---|---|
| 4,611,111 A | 9/1986 | Baheti et al. |
| 4,613,743 A | 9/1986 | Nied et al. |
| (Continued) | | |

FOREIGN PATENT DOCUMENTS

| | | |
|---|---|---|
| JP | 9-108866 A | 4/1997 |
| JP | 2000-42769 A | 2/2000 |
| (Continued) | | |

OTHER PUBLICATIONS

JP2000-042769A computer english translation (Year: 2000).*

(Continued)

*Primary Examiner* — Erin B Saad
(74) *Attorney, Agent, or Firm* — Mattingly & Malur, PC

(57) ABSTRACT

Some examples include a computing device that receives optical signal information based on respective optical signals received through a plurality of optical fibers during a welding operation. For example, the plurality of optical fibers may be positioned to receive electromagnetic radiation from a weld area during the welding operation. The computing device may compare the optical signal information corresponding to a first one of the optical fibers with the optical signal information corresponding to a second one of the optical fibers. Based at least partially on the comparing, the computing device may determine whether at least one of a weld geometry or a welding arc is irregular. The computing device may perform at least one action based on determining that at least one of the weld geometry or the welding arc is irregular.

19 Claims, 15 Drawing Sheets

(56) References Cited

U.S. PATENT DOCUMENTS

| | | | |
|---|---|---|---|
| 5,061,841 A | 10/1991 | Richardson | |
| 6,329,635 B1 | 12/2001 | Leong et al. | |
| 6,399,915 B1 | 6/2002 | Mori et al. | |
| 2002/0134768 A1* | 9/2002 | Akaba | B23K 26/0604 219/121.63 |
| 2009/0212028 A1* | 8/2009 | Watanabe | B23K 26/348 219/121.63 |
| 2011/0089149 A1* | 4/2011 | Watanabe | B23K 9/173 219/121.63 |
| 2014/0144896 A1 | 5/2014 | Einav et al. | |

FOREIGN PATENT DOCUMENTS

| | | |
|---|---|---|
| JP | 2000-271768 A | 10/2000 |
| JP | 2005-131645 A | 5/2005 |

OTHER PUBLICATIONS

C.P. Mota et al., Near-Infrared Vision System for Arc-Welding Monitoring, Weld Int., 29(3), 2015, pp. 187-196.

T.W. Kim and Y.W. Park, Influence of welding parameters on weld bead in laser arc hybrid welding process using coaxial monitoring system and image processing, Materials Research Innovations, vol. 18, 2014, pp. S2-898-S2-901.

Y. Fujita et al., Development of a welding monitoring system for in-process quality control of thick walled pipe, Welding in the World., Nov. 2012, vol. 56, Issue 11-12, pp. 15-25.

M. St. Weglowski, Modeling and analysis of arc light spectrum in GMAW, Weld J., 87(8), 2008, p. 212-218.

M. St. Weglowski, Utilization of the arc light emission emitted by an electric arc to monitor the TIG process, Doctoral thesis, AGH University of Science and Technology, Krakow, Poland.

M. St. Weglowski, Measurement of arc light spectrum in the MAG welding method, Metrology and Measurement Systems, 16(1), 2009, pp. 143-159.

P.B. Garcia-Allende et al., Spectral processing technique based on feature selection and artificial neural networks for arc-welding quality monitoring, NDT&E International, 42, 2009, pp. 56-63.

S.C.A. Alfaro et al., Emission spectrometry evaluation in arc welding monitoring system, Journal of Materials Processing Technology, 179, 2006, pp. 219-224.

I. Polajnar et al., Arc welding process monitoring by audible sound, The 12th International Conference of the Slovenian Society for Non-Destructive Testing, 2013, pp. 613-620.

Y. Wang, P. Zhao, Noncontact acoustic analysis monitoring of plasma arc welding, Int. J. Pres. Ves. Pip., 78, 2001, pp. 43-47.

Japanese Office Action received in corresponding Japanese Application No. 2019-038428 dated Nov. 19, 2019.

\* cited by examiner

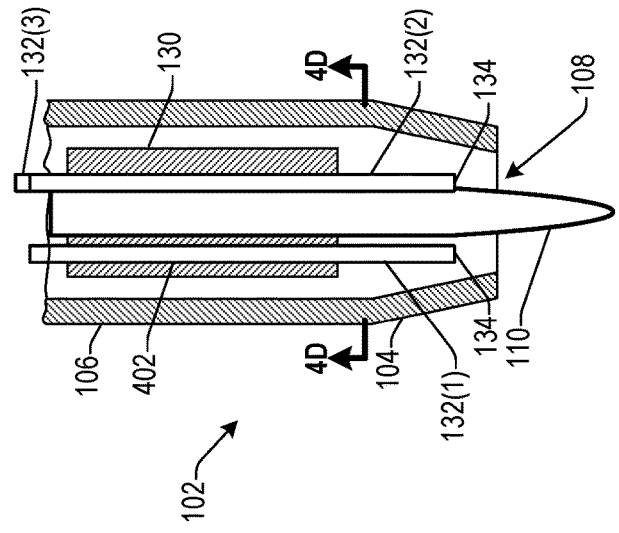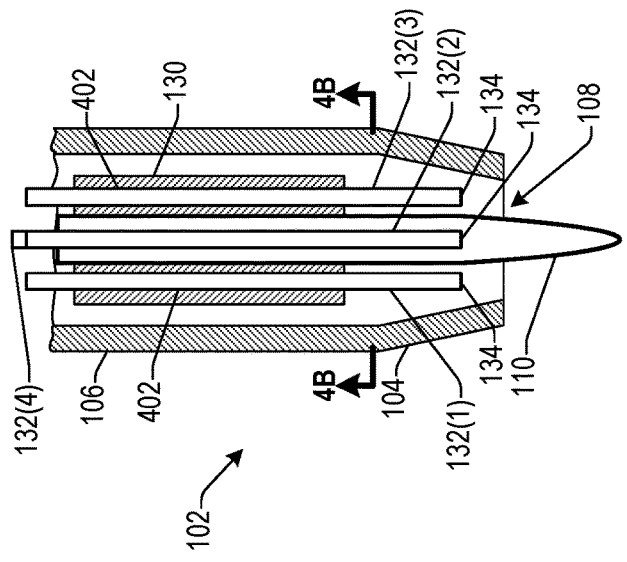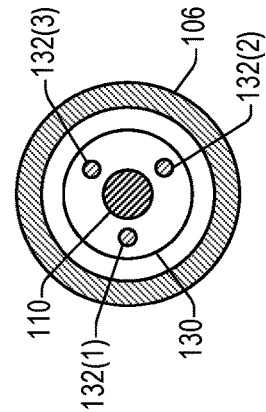

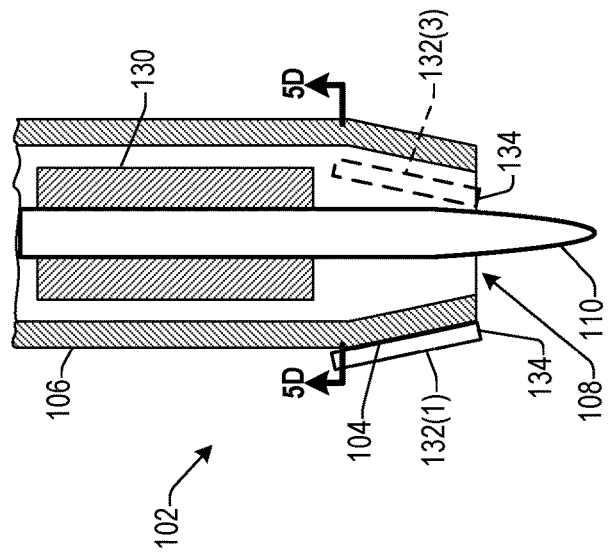
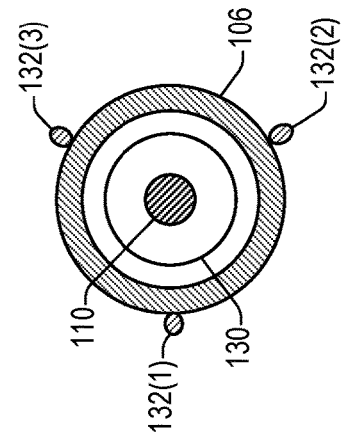
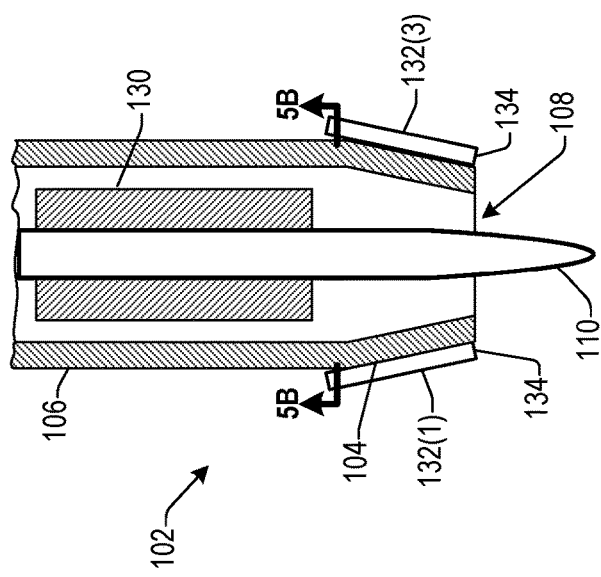

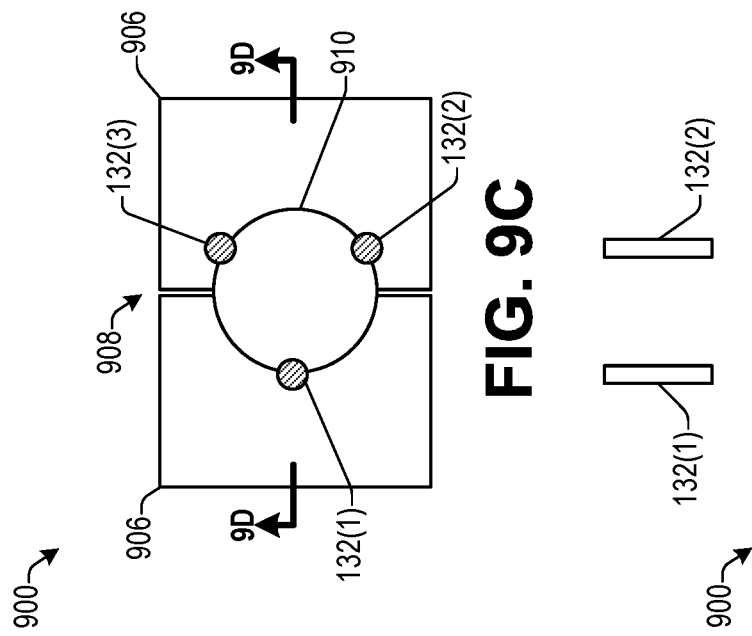
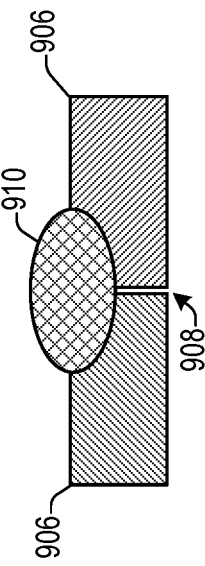
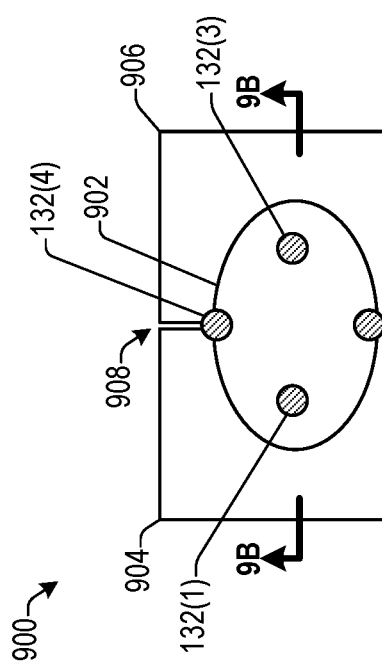
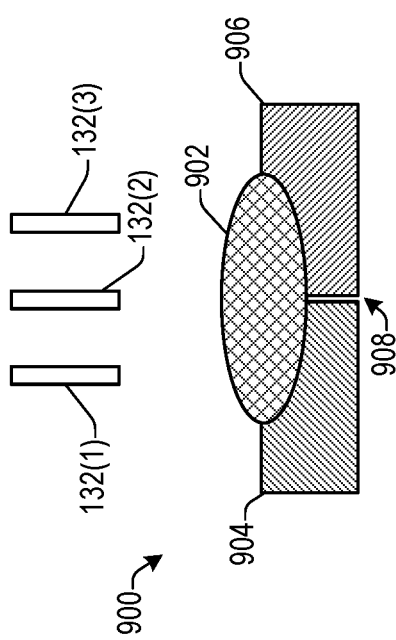

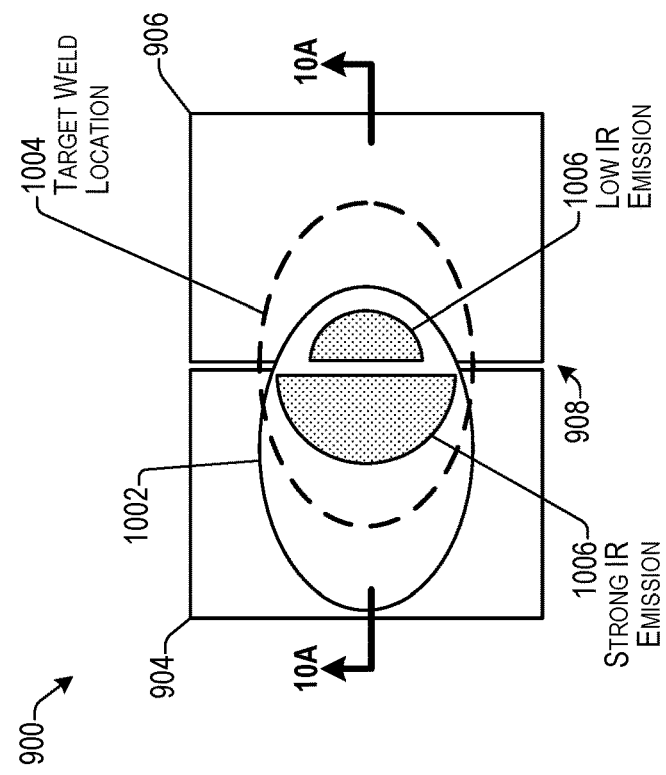
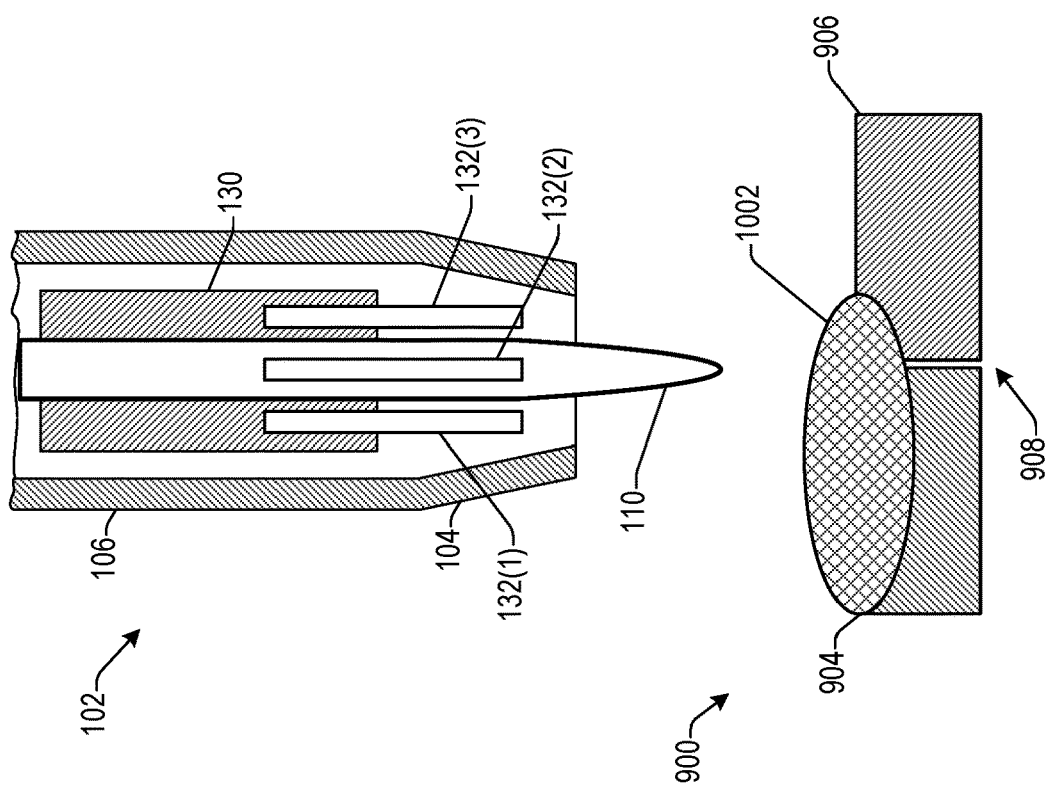

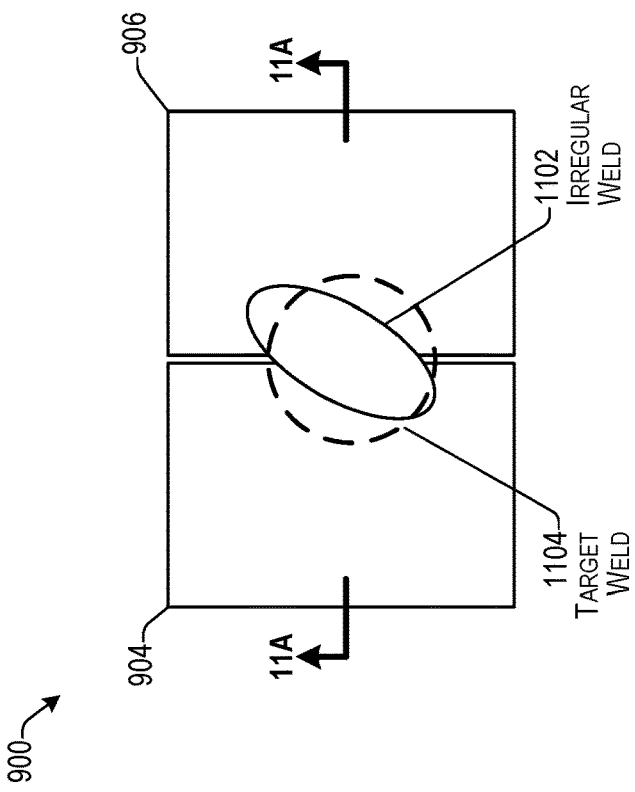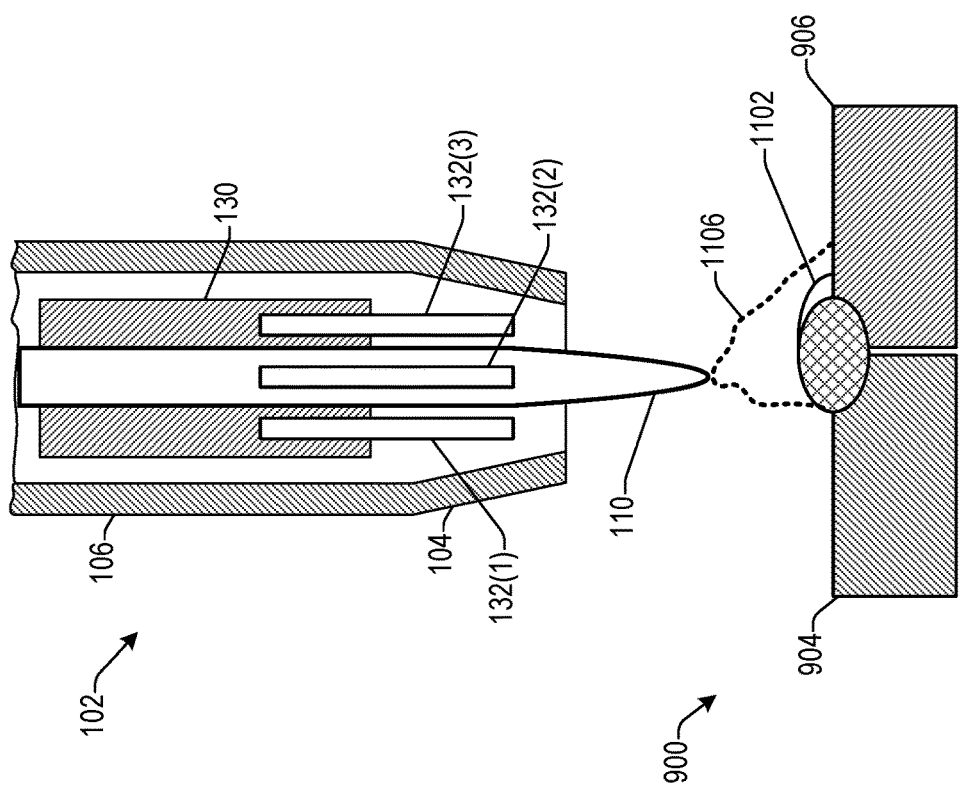

IN-PROCESS WELD MONITORING AND CONTROL

BACKGROUND

Tungsten inert gas (TIG) welding, also known as gas tungsten arc welding (GTAW), is at type of arc welding process that uses a non-consumable tungsten welding electrode for forming a weld. The weld area and the welding electrode are protected from oxidation or other atmospheric contamination by an inert shielding gas (e.g., argon, helium, carbon dioxide), and a filler metal may be used, although some types of welds, referred to as autogenous welds, do not employ filler material. A constant-current welding power supply may provide electrical energy that is conducted across an arc between the welding electrode and the workpiece through highly ionized gas and metal vapors.

TIG/GTAW is widely used in many industry sectors and is conducive to use with robotic welding systems. However, welding defects may affect the usefulness of this welding technology. Welding defects and other irregularities may be categorized into several different categories, such as geometric defects, internal defects, property defects, and so forth. For instance, internal defects may include lack of fusion, lack of penetration, internal porosity, internal cracks, and the like. Geometric defects may include incorrect weld bead geometry, such as weld bead size, weld bead shape, and/or weld bead location. Property defects may include incompatible materials, non-metallic inclusions, and the like. Defects such as those discussed above, may directly result in a defective final product and corresponding revenue loss. For instance, such a defective product might have a lower than expected weld strength, a shorter than expected service life, and/or irregular or off-set weld locations that are not aesthetically acceptable to a customer.

SUMMARY

Some implementations include arrangements and techniques monitoring a welding operation, and some implementations may further include controlling the welding operation based on the monitoring, e.g., as the welding is performed. As one example, a computing device may receive optical signal information based on respective optical signals received through a plurality of optical fibers during a welding operation. For example, the plurality of optical fibers may be positioned to receive electromagnetic radiation from a weld area during the welding operation. The computing device may compare the optical signal information corresponding to a first one of the optical fibers with the optical signal information corresponding to a second one of the optical fibers. Based at least partially on the comparing, the computing device may determine whether at least one of a weld geometry or a welding arc is irregular. The computing device may perform at least one action based on determining that at least one of the weld geometry or the welding arc is irregular.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 4A-4D illustrate example optical fiber placement locations according to some implementations.

FIGS. 5A-5D illustrate example optical fiber placement locations according to some implementations.

FIGS. 9A-9D illustrate example weld geometries according to some implementations.

FIGS. 10A-10B illustrate an example of weld geometry monitoring according to some implementations.

FIGS. 11A-11B illustrate an example of monitoring arc blow according to some implementations.

DETAILED DESCRIPTION

Figure 1:
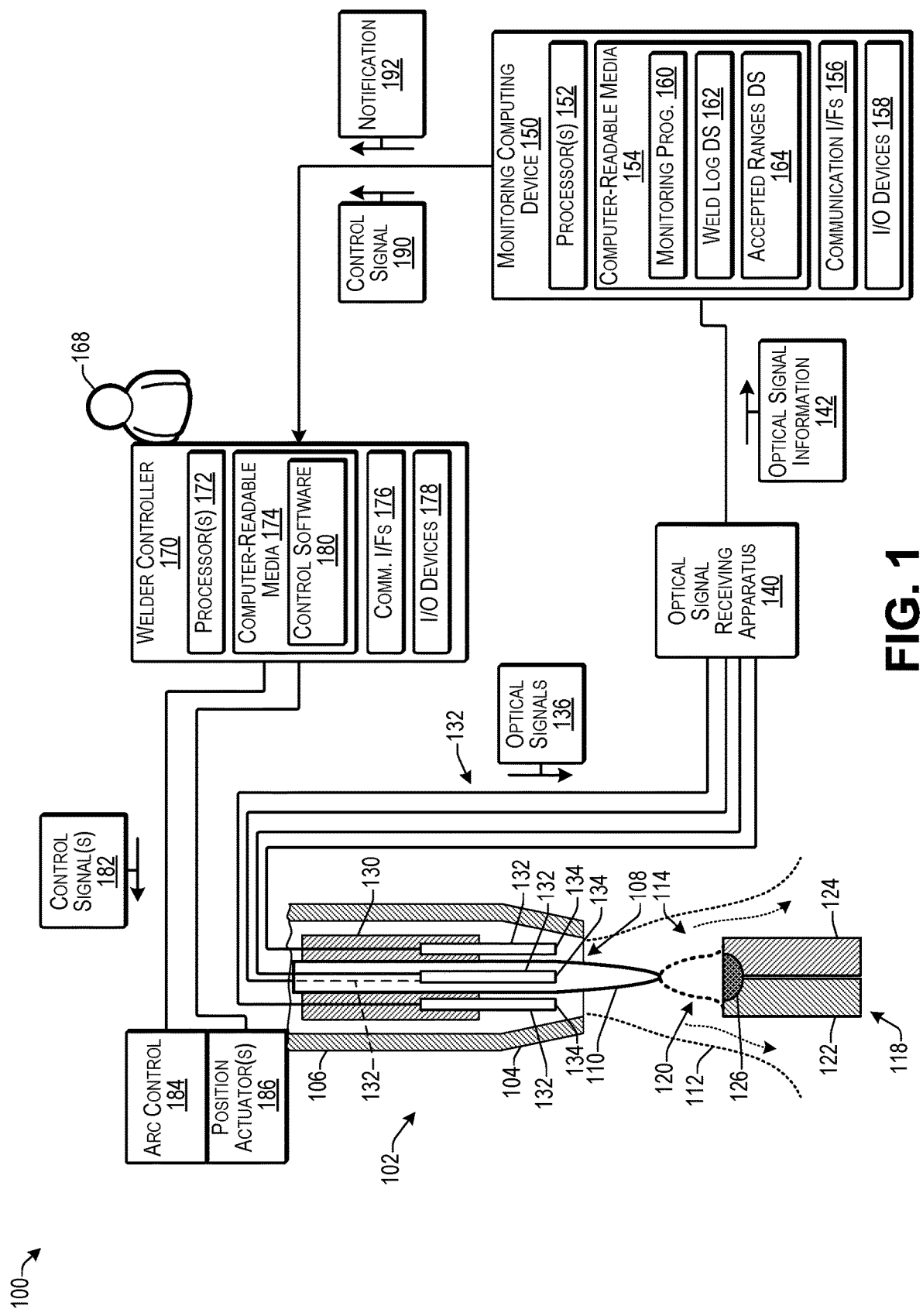
FIG. 1 illustrates an example welding system according to some implementations.

The technology herein includes novel arrangements and techniques for automated welding that may include detecting a welding irregularity during welding. Some implementations may further include, based on detecting a welding irregularity, adjusting one or more welding parameters in during the welding or subsequent to the welding, sending a notification to an operator, and/or performing a repair action. In some examples, a plurality of optical fibers may be mounted on a welding tool for receiving electromagnetic radiation from a weld area during the welding. The optical fibers may provide optical signals to enable real time monitoring of the welding for detecting welding irregularities during the welding. The system herein is able to detect irregularities such as welding arc irregularities and/or weld geometry irregularities, and adjust welding parameters during or after the welding process. Accordingly, the examples herein provide for inspection of each weld as the weld is being formed.

In some implementations, the system herein may include a plurality of optical fibers mounted on or otherwise associated with the welding tool. For example, the optical fibers may be mounted in or on a welding tool collet, mounted in or on a welding tool housing or nozzle, and/or mounted on the welding electrode. The optical fibers may receive visible and nonvisible light (electromagnetic radiation) from the welding arc and the weld pool and/or weld bead. The received light may be analyzed to monitor and compare optical signals received through optical fibers at different locations in real time. Optical signals received through optical fibers at different locations may be processed so that weld geometry, such as size, shape, and location can be determined from the optical signal. The received optical data may be logged and/or instantly sent to an operator for action such as parameter adjustment or weld repair. Additionally, an adaptive controller may be used to automatically adjust weld parameters and/or to automatically repair an irregular weld. Consequently, examples herein may improve the reliability of welds and welded products, reduce the number of defective products, and save time previously required for inspection and repair following completion of welding.

The techniques herein enable real-time weld monitoring of all welds by monitoring the weld arc and weld bead formation. Some examples may include performing automatic adjustment of the welding tool and/or the arc, and/or may include performing automatic repair of a weld when necessary. During welding, the installed optical fibers receive an optical signal (e.g., electromagnetic radiation emissions) emitted from the welding arc and the melt pool using e.g., three optical fibers in the case of a round weld bead shape, or e.g., four optical fibers in the case of an elliptical weld bead shape. The optical fibers may be attached to the welding tool, at any of a number of possible mounting locations positioned around the welding tool. The system herein enables prediction of weld geometry attributes, such as size, shape, and location, in real time during the welding process by comparing the optical signals received from a plurality of different locations.

In some cases, the weld bead geometry may be indicative of welding performance and may be useful for ensuring properly formed welds in the case of products that involve extensive use of automated arc welds during assembly. In some examples, the three, four, or more optical fibers herein may be distributed symmetrically (or in other examples irregularly) around the shielding gas nozzle of an arc welding tool to receive the light spectrum from different locations/perspectives. For instance, the intensities of the infrared signals received through these sensors may be measured and compared to determine the melt pool geometry, which may be indicative of weld irregularities. Furthermore, the emission intensities of the ultraviolet and/or visible signals received through the sensors may be measured and compared to determine any abnormal arc conditions, such as arc blow, which may lead to skewed welds, improperly shaped welds, or other weld irregularities.

The received optical signal information and the comparison results may be logged and stored in a weld data log. In addition, the results may be immediately provided to a human operator or an automated welding controller for immediate action, such as when an irregularity in the welding in detected. An adaptive control algorithm may be employed to change one or more welding parameters when an irregularity is detected for reducing or eliminating additional irregularities and/or for performing a repair action on a detected irregular weld. Accordingly, implementations herein provide improved control over welding performance, quicker awareness for responding to irregularities, the ability to automatically reduce further irregularities, and the ability to automatically repair detected irregularities.

For discussion purposes, some example implementations are described in the environment of automated TIG (GTAW) welding. However, implementations herein are not limited to the particular examples provided, and may be extended to other manufacturing environments, other applications, other welding tool configurations, and other types of welding, as will be apparent to those of skill in the art in light of the disclosure herein. For instance, some examples herein may relate to TIG welding of products that may be assembled by industrial robots or other automated welding machines. However, implementations herein may be extended to other arc welding techniques, such as manual TIG welding, semi-automatic TIG welding, and other types of automated and non-automated welding, such as gas metal arc welding in manual, semi-automatic or fully automatic manner, laser welding, friction stir welding, plasma welding, and the like. Accordingly, implementations herein are not limited to TIG welding.

FIG. 1 illustrates an example welding system 100 according to some implementations. In this example, a welding tool 102 includes a nozzle 104 at one end of a tubular body 106. The nozzle 104 includes a nozzle opening 108 through which a welding electrode 110 may extend. During welding, an inert gas such as argon, helium, carbon dioxide, mixtures thereof, or other gases, may be expelled outward from the nozzle opening 108 for creating a gas shield 112 around a weld area 114 where welding is being performed. The gas shield 112 helps prevent oxidation or other contamination of the weld.

During welding, a high-frequency generator (not shown in FIG. 1) may be used to generate an arc 120 between the welding electrode 110 and the workpiece 118. Typically, the generator may provide a constant current to generate the arc 120, while a space is maintained between the welding electrode and the surface of the workpiece 118. In this example, the workpiece 118 includes a first workpiece portion 122 and a second workpiece portion 124 that are placed adjacent to each other to perform a butt weld operation. In other examples, however any other type of weld may be performed according to the examples herein such as a lap joint weld, a fillet joint weld, a tee joint weld, an edge joint weld, a girth joint weld, and so forth. Accordingly, the examples herein are not limited to any particular type of weld, workpiece material, workpiece configuration, or the like.

The arc 120 melts the metal of the workpiece 118 to create a melt pool 126. The size of the melt pool 126 may depend at least partially on the size of the welding electrode 110, the amount of current, and the amount of separation between the welding electrode 110 and the surface of the workpiece 118. In some examples, a nonconsumable tungsten electrode may be used as the welding electrode 110, either without a filler material, as illustrated, or in other examples with a filler material. Furthermore, in other examples, a consumable electrode may be used.

In the illustrated example, the welding electrode 110 is supported in place inside the housing 106 by a collet 130. A plurality of optical fibers 132 are mounted on or within the collet 130 in positions around the welding electrode 110. In this example, there are four optical fibers 132 with three of the optical fibers 132 being visible and the fourth being located on the opposite side of the welding electrode 110 and, thus, obscured from view by the welding electrode 110. The optical fibers 132 each include a receiving end 134 facing the weld area 114.

The weld area 114 includes the melt pool 126 (and/or a weld bead when formed) and the arc 120 when active. For example, electromagnetic radiation from the weld area 114, including radiant emissions from the weld pool 126 (and weld bead when formed) and the arc 120 may enter the receiving end 134 of each optical fiber 132, and may be transferred through the optical fibers 132 as optical signals 136 to an optical signal receiving apparatus 140. In some examples, the electromagnetic radiation received by the optical fibers 132 from the weld area 114 may include ultraviolet (UV) electromagnetic radiation, visible light, and infrared (IR) electromagnetic radiation.

In some examples, the optical signal receiving apparatus 140 may include a plurality of spectrometers (not shown in FIG. 1) that receive the optical signals 136 from the optical fibers 132 and convert the optical signals 136 to digital data that corresponds to optical signal information 142. In other examples, the optical signal receiving apparatus 140 may include a plurality of beam splitters, a plurality of physical light filters, and a plurality of light sensors, such as an infrared sensor and a visible light and/or ultraviolet sensor (not shown in FIG. 1). The sensors may convert the received light into digital data that corresponds to the optical signal information 142. Additional details regarding the optical signal receiving apparatus 140 are discussed below with respect to FIGS. 2 and 3. Furthermore, while two examples of the optical signal receiving apparatus 140 are discussed herein, various other possible apparatus configurations will be apparent to those of skill in the art having the benefit of the disclosure herein.

The optical signal information 142 is received by a monitoring computing device 150. In some examples, the monitoring computing device 150 may be connected directly to the optical signal receiving apparatus 140 via a direct wired or optical connection. In other examples, the optical signal receiving apparatus 140 may include one or more communication interfaces (not shown in FIG. 1) that enable the monitoring computing device 150 to receive the optical signal information 142 over one or more networks such as a local area network (LAN), a wide area network (WAN), or the like, by wire, wirelessly, any combination thereof, or via a direct radio transmission or other type of direct transmission.

The monitoring computing device 150 may be any suitable type of computing device, e.g., portable, semi-portable, semi-stationary, or stationary. Some examples of the monitoring computing device 150 may include tablet computing devices; smart phones and mobile communication devices; laptops, netbooks and other portable computers or semi-portable computers; desktop computing devices, server computing devices, and other semi-stationary or stationary computing devices, as well as various other computing devices capable of sending and receiving communications and performing the functions according to the techniques described herein.

In the illustrated example, the monitoring computing device 150 includes at least one processor 152, one or more computer-readable media 154, one or more communication interfaces 156, and one or more input/output (I/O) devices 158. Each processor 152 may itself comprise one or more processors or processing cores. For example, the processor 152 can be implemented as one or more microprocessors, microcomputers, microcontrollers, digital signal processors, central processing units, state machines, logic circuitries, and/or any devices that manipulate signals based on operational instructions. In some cases, the processor 152 may be one or more hardware processors and/or logic circuits of any suitable type specifically programmed or otherwise configured to execute the algorithms and processes described herein. The processor 152 can be configured to fetch and execute computer-readable processor-executable instructions stored in the computer-readable media 154.

Depending on the configuration of the monitoring computing device 150, the computer-readable media 154 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 154 may include, but is not limited to, RAM, ROM, EEPROM, flash memory, solid-state storage, magnetic disk storage, optical storage, and/or other computer-readable media technology. Further, in some cases, the monitoring computing device 150 may access external storage, such as RAID storage systems, storage arrays, network attached storage, storage area networks, cloud storage, or any other medium that can be used to store information and that can be accessed by the processor 152 directly or through another computing device or network. Accordingly, the computer-readable media 154 may be computer storage media able to store instructions, modules or components that may be executed by the processor 152. Further, when mentioned, non-transitory computer-readable media exclude media such as energy, carrier signals, electromagnetic waves, and signals per se.

The computer-readable media 154 may be used to store and maintain any number of functional components that are executable by the processor 152. In some implementations, these functional components comprise instructions or programs that are executable by the processor 152 and that, when executed, implement operational logic for performing the actions and services attributed above to the monitoring computing device 150. Functional components of the monitoring computing device 150 stored in the computer-readable media 154 may include a monitoring program 160. In this example, the monitoring program 160 may receive the optical signal information 142 and may perform analysis of the received optical signal information from the three or more optical fibers 132 mounted on the welding tool 102. For example, as discussed additionally below, the monitoring program 160 may determine infrared signal intensity and the difference between any two signals out of the at least three optical signals received through the optical fibers for determining any melt pool geometry irregularities.

In addition, the monitoring program 160 may determine the emission intensity of the received ultraviolet light and/or visible light from the three or more optical signals received through the optical fibers for determining whether the welding arc is normal or irregular. In addition, the monitoring program 160 may generate one or more weld log data structures (DS) 162 that may include the received optical signal information 142 and the weld information determined from the received optical signals, such as whether the welding is normal or irregular. The monitoring program 160 may store the weld log data structure 162 in the computer readable media 154 and/or may send information from the weld log data structure 162 to another computing device over one or more networks (not shown in FIG. 1).

In addition, the computer-readable media 154 may also store data, data structures, and the like, that are used by the functional components. For example, data stored by the computer-readable media 154 may include the weld log data structure 162. In addition, the monitoring computing device 150 may store or may access an accepted ranges data structure (DS) 164 that may include empirically determined accepted ranges for the optical signal information for each portion of the welding monitored by each optical fiber 132. For instance, the accepted ranges for signal intensity during each stage of the welding may be determined in advance and stored in the accepted ranges data structure 164. The monitoring program 160 may access the accepted ranges data structure 164 in some examples to determine if the measured signal intensities for a current weld fall within the accepted ranges in the accepted ranges data structure 164.

Depending on the type of the monitoring computing device 150, the computer-readable media 154 may also optionally include other functional components and data, which may include other programs, drivers, etc., and the data used or generated by the other functional components. Further, the monitoring computing device 150 may include many other logical, programmatic and physical components, of which those described are merely examples that are related to the discussion herein.

The communication interface(s) 156 may include one or more interfaces and hardware components for enabling communication with various other devices, such as over one or more networks or directly. For example, communication interface(s) 156 may enable communication through one or more of the Internet, cable networks, cellular networks, wireless networks (e.g., Wi-Fi) and wired networks (e.g., Ethernet or optical), as well as close-range communications such as BLUETOOTH®, BLUETOOTH® low energy, and the like.

The monitoring computing device 150 may further include the one or more I/O devices 158. The I/O devices 158 may include speakers, a display, a microphone, a camera, and various user controls (e.g., buttons, a joystick, a keyboard, a keypad, etc.), a haptic output device, and so forth. For instance, at least one of the display or the speakers may be used to provide a notification to an operator 168 of a welder controller 170 in the case of the detection of an irregular weld.

The welder controller 170 may include one or more processors 172, computer readable media 174, one or more communication interfaces 176, and one or more I/O devices 178. In some examples herein, the one or more processors 172 may include any of the processors 152 discussed above, the computer readable media 174 may include any of the computer readable media 154 discussed above, the communication interfaces 176 may include any of the communication interfaces 156 discussed above, and the I/O devices 178 may include any of the I/O devices 158 discussed above. The welder controller processor 172 may execute control software 180, which may be used to control the welding process performed by the welding tool 102 with respect to the workpiece 118. For example, the control software 180 executed by the welder controller 170 may send one or more control signals 182 to an arc control 184 and/or to one or more position actuators 186. For example, the arc control 184 may control the amount of current provided to the welding electrode 110 for controlling the intensity of the arc 120.

In addition, the one or more position actuators 186 may control the position of the welding tool 102 with respect to the workpiece 118 or vice versa. For example, the position actuators may move the welding tool 102 and/or the workpiece 118 toward or away from each other, may control the angle of the welding tool with respect to the workpiece 118, may control the movement of the welding tool 102 and/or the workpiece 118, or the like. As one example, the position actuator 186 may be part of a robotic mechanism for applying one or more welds to one or more locations on the workpiece 118. However, implementations herein are not limited to any particular type of mechanism four: the position of the welding tool with respect to the workpiece 118. Furthermore, in other examples, the one or more position actuators 186 may not be included and the welding tool 102 may be positioned manually or the like.

In some examples, the welder controller 170 and the monitoring computing device 150 may be the same computing device and/or may include at least some of the same software or other functional components. For example, the monitoring computing device 150 may execute the control software 180 and may send the control signals 182 directly to the arc control 184 and/or the position actuators 186. In other examples, the welder controller 170 may execute the monitoring program 160 for receiving the optical signal information 142, determining the results of the optical signal analysis, and for detecting any abnormalities in the weld geometry and/or the arc 120. Accordingly, one of the welder controller 170 or the monitoring computing device 150 may be eliminated in some examples herein. Numerous other possible system configurations will be apparent to those of skill in the art having the benefit of the disclosure herein.

In the illustrated example, four optical fibers are evenly distributed around the welding electrode 110 for in-process monitoring and control of the welding process performed on the workpiece 118. As mentioned above, in other examples, three optical fibers might be used depending on the desired weld geometry, while in still other cases, more than four optical fibers may be used, such as five, six, eight, ten, etc., in various locations on the welding tool 102, as discussed additionally below. Some implementations herein determine weld bead (e.g., spot weld) geometry by referring to and comparing the optical signals collected from the multiple optical fibers at the specific locations, which may be evenly distributed around the welding electrode 110, such as by being embedded in the collet 130. For instance, in the illustrated example, the collet 130 may be perforated with a plurality of through holes to receive and support the optical fibers 132.

In the illustrated example, the optical fibers 132 are symmetrically arranged in a circular pattern around the welding electrode 110 (e.g., based on radial symmetry around a center of the electrode 110), as discussed additionally below. Furthermore, the shielding gas 112 passing through the nozzle 104 may serve as a cooling medium for the optical fibers 132 in addition to providing a shielding function for preventing oxidation of the weld. In some cases, an additional cooling medium may be provided, or alternatively, the shielding gas itself may be cooled to a lower temperature than that used in conventional arc welding applications.

As mentioned above, the optical fiber receiving ends 134 may receive the light emitted from the arc 120 and the weld area 114 and the optical fibers may transmit the received light as optical signals 136. The optical signal receiving apparatus 140 receives the optical signals 136 from the optical fibers 132 and provides optical signal information 142 to the monitoring computing device 150. As discussed in additional detail below with respect to FIGS. 2 and 3, the monitoring computing device 150 analyzes the optical signal information 142. Based on the analysis result, if a weld irregularity is detected, the monitoring program 160 may send at least one of a control signal 190 or a notification 192. For example, the control signal 190 may cause the control software 180 on the welder controller 170 to send a control signal 182 to at least one of the arc control 184 or a position actuator 186. Additionally, or alternatively, the monitoring program 160 may send and/or otherwise provide a notification 192 to an operator 168 who may perform a manual action for addressing the weld irregularity detected by the monitoring program 160.

The system 100 herein acquires and analyzes optical signals during a welding process and uses the acquired optical signals to identify any weld irregularities. In some examples, an accepted signal intensity range may be set individually for each optical fiber, such as based on the type and geometry of the weld that is desired to be formed. The accepted ranges may be stored in the accepted ranges data structure 164, which may be accessed during analysis of the received optical signals for comparing the received optical signals with the accepted ranges set for each optical fiber. In addition, an accepted range may be set for signal intensity difference for comparing the optical signal difference between each two optical sensors in a set of optical sensors mounted on a welding tool.

An irregular weld may be determined when the results of the comparison are outside of the above-mentioned accepted ranges. By adopting this irregularity judgment algorithm, a determination of normal or irregular (or pass/fail) may be provided to operator and the received optical data, along with analysis results, may be recorded in the data log data structure 162, or other database, or the like. In some examples, the operator may make manual repairs to the weld irregularity, such as in case that the weld irregularity is fixable. Alternatively, in some examples, the welder controller may 170 may automatically operate the position actuators 186 and/or arc control 184 to repair an irregular weld.

In other cases, such as when the weld irregularity cannot be repaired, the welder controller 170 may still send one or more control signals 182 to adjust the settings (e.g., position and/or arc intensity) of the welding tool 102 to avoid weld irregularities for subsequent welds. In addition to a normal/irregular (or pass/fail) judgment criterion, a more stringent criterion may adopted in some examples to enable early correction of irregularities before the weld is fully formed in an irregular manner. For instance, the welder controller 170 may immediately send control signals 182 upon detection of arc blow, or the like, to attempt to accommodate for the detected irregularities in real time during the welding process, such as by causing the a change in the position of the welding tool 102, changing the workpiece position, adjusting the arc intensity, and so forth. Correction measures are based on user's success experience.

Furthermore, depending on the product being manufactured and the manufacturing process, the welding tool configurations and welding configurations may vary. In addition, the varied welding configurations, the desired weld joint shape and geometries may change. By modifying the arrangement of individual optical fibers on the welding tool 102 and by assigning proper accepted ranges for radiant UV and visible light intensity and measured radiant IR energy, the monitoring system herein is able to be applied to numerous types of welds, such as lap joint, fillet joint, tee joint, edge joint, girth joint, and so forth. Accordingly, implementations herein are not limited to any particular welding configuration or workpiece configurations.

Thus, the system 100 herein is able to utilize multiple optical signals obtain from multiple respective optical fibers to receive light from a weld location (e.g., a melt pool location) from plurality of different perspectives. The optical signals are received and compared to each other and to reference signal parameters for determining whether a weld is properly formed or irregular. Thus, the system herein is able to monitor weld geometries and weld arcs in real time as the welding is taking place and may further send control signals based on the monitoring, such as for taking corrective action during the welding in the case of a detected irregularity.

Figure 2:
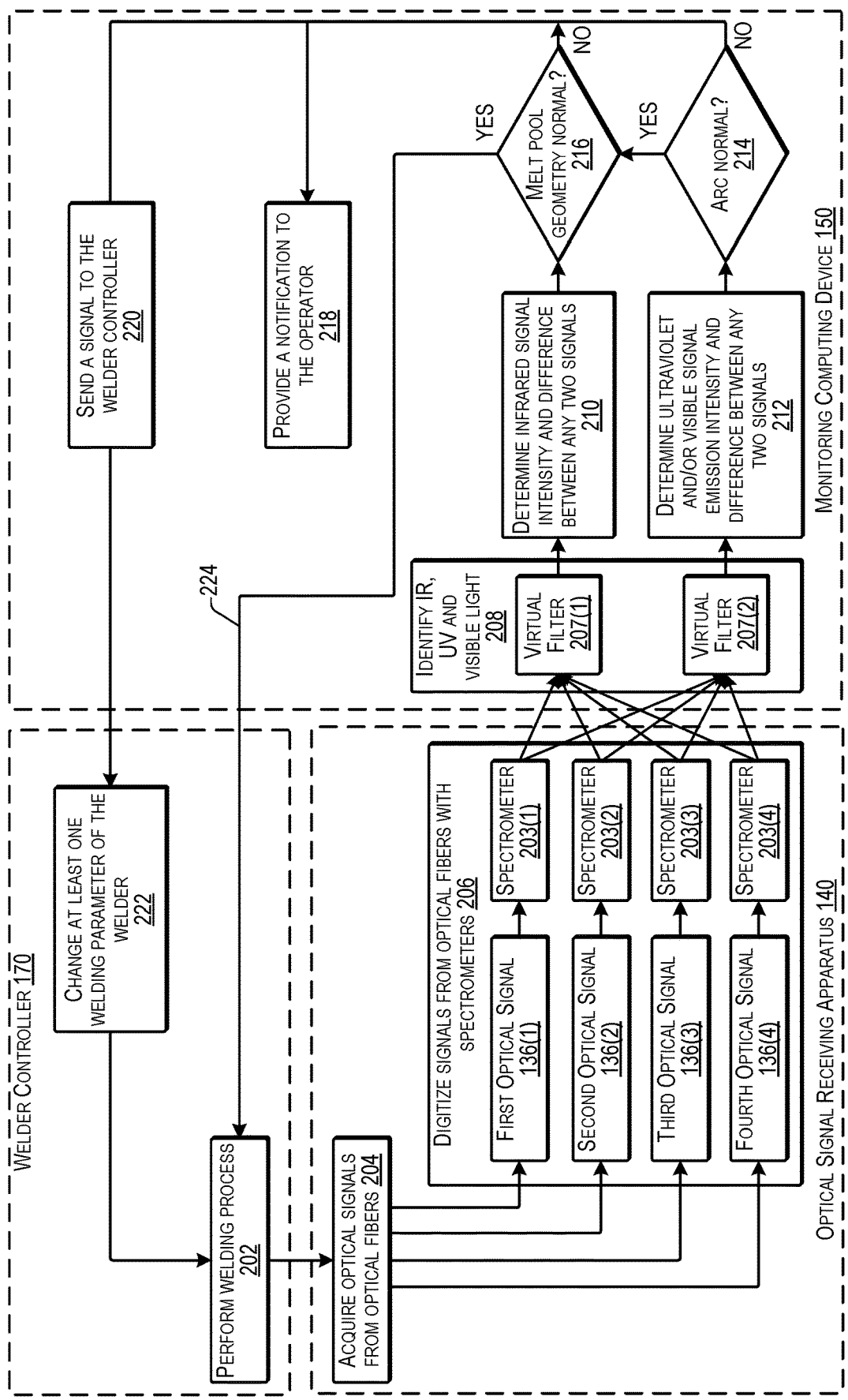
FIG. 2 is a flow diagram illustrating an example process according to some implementations.
Figure 3:
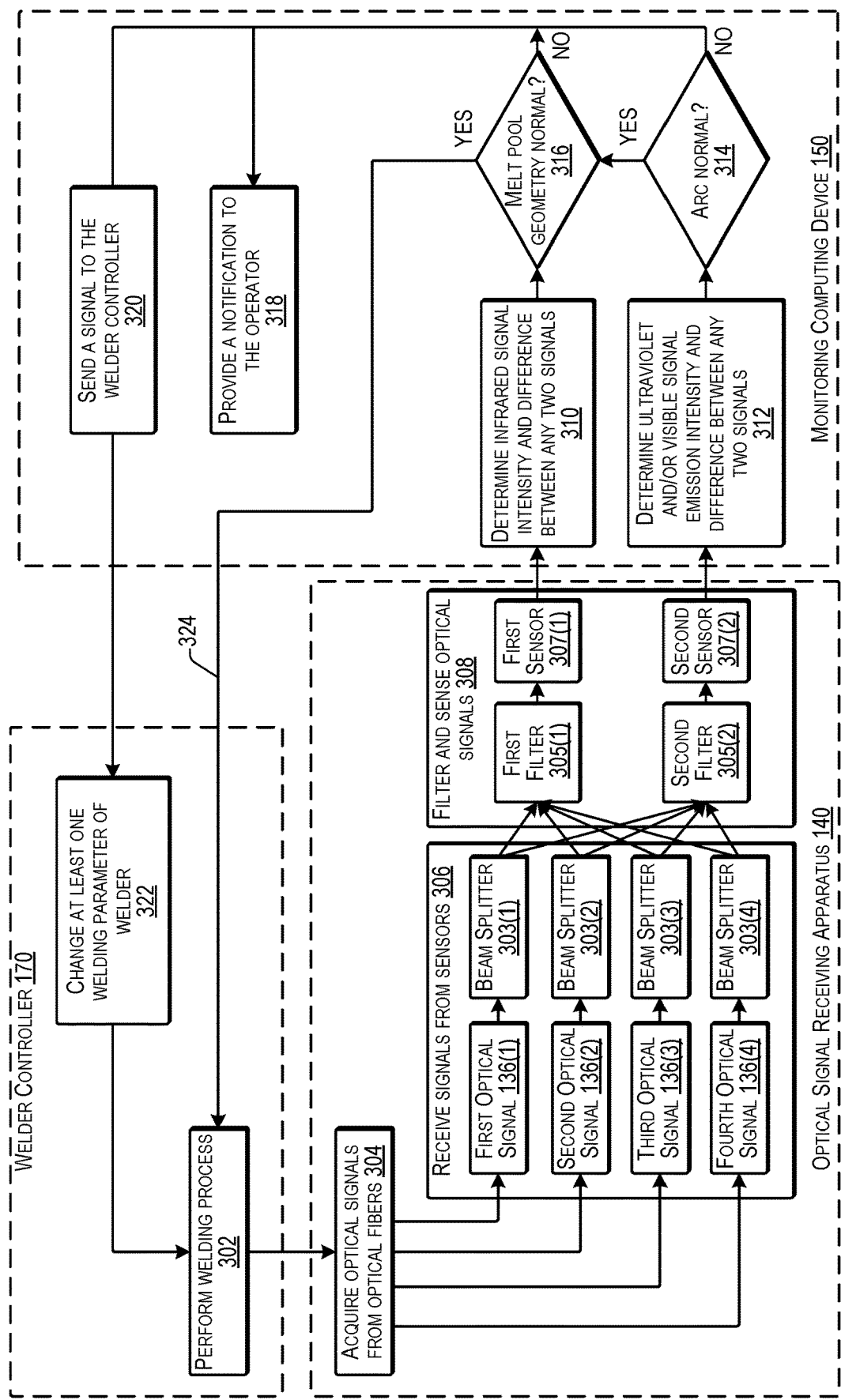
FIG. 3 is a flow diagram illustrating an example process according to some implementations.

FIGS. 2 and 3 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems and apparatuses described in the examples herein, although the processes may be implemented in a wide variety of other environments, systems and apparatuses.

FIG. 2 is a flow diagram illustrating an example process 200 according to some implementations. In some examples, the process 200 may be an algorithm executed in part by the optical signal receiving apparatus 140, in part by the computing device 150, and in part by the welder controller 170 to monitor and control the arc and weld geometry of welds, such as spot welds, using optical signals received from multiple optical fibers during automated welding.

As mentioned above, implementations herein may compare multiple optical signals received through multiple optical fibers to detect differences that indicate an irregularity in weld geometry, such as size or shape of a weld, and any welding arc irregularities, such as arc blow, during welding. Accordingly, rather than relying on an image or the like of the weld pool or weld bead, implementations herein compare acquired optical signal intensities acquired from multiple different locations around the weld area to determine weld geometry and arc configuration for detecting any irregularities. Furthermore, in the examples herein, the optical fibers may be flexibly positioned in various locations on the welding tool, so as to allow for optimal mounting locations for different weld tool supporting structures, different types of assembly operations, etc., and may be evenly distributed around the electrode, or may be irregularly distributed, depending at least partially on the intended weld geometry.

At 202, the welder controller 170 may perform a welding process. For example, the welder controller 170 may initiate a welding process on a workpiece or may continue a welding process on a workpiece.

At 204, the optical signal receiving apparatus 140 may acquire signals from the optical fibers. For example, during the welding, the optical fibers may receive electromagnetic radiation emitted in wavelengths of ultraviolet light, visible light, and infrared light emitted by the arc and the weld area, and may transmit these wavelengths along the optical fibers to the optical signal receiving apparatus 140. Accordingly, in this example, suppose that there are four optical fibers, as in the example of FIG. 1 discussed above, and therefore the optical signal receiving apparatus 140 may acquire a first optical single 136(1), a second optical signal 136(2), a third optical signal 136(3), and a fourth optical signal 136(4).

At 206, the optical signal receiving apparatus 140 may digitize the optical signals from the optical fibers using one or more spectrometers 203 included in the optical signal receiving apparatus 140. In this example, suppose that there is a spectrometer 203 corresponding to each received optical signal 136, such as a first spectrometer 203(1), a second spectrometer 203(2), a third spectrometer 203(3), and a fourth spectrometer 203(4), to receive the optical signals 136(1)-136(4), respectively. The spectrometers 203 receive the respective optical signals 136 and generate optical information based on the received optical signal 136 that is indicative of the received wavelengths in the received optical signal 136. Typically, the optical information output by the spectrometers 203 may be digital information indicating the wavelengths measured in the received optical signals 136; however, in some alternative examples, the optical information may be analog information instead.

At 208, the monitoring computing device 150 may identify infrared signals, ultraviolet signals, and visible light signals in the spectrometer output. For example, the processor on the monitoring computing device 150 may execute a first virtual filter 207(1) that receives the spectrometer outputs from each of the spectrometers, identify the infrared wavelength portions of the spectrometer outputs, and provide the infrared wavelength information to an analysis process. Similarly, the second virtual filter 207(2) a represents a process performed by the processor to receive the spectrometer outputs from each spectrometer, identify the ultraviolet and/or visible wavelength portions of the spectrometer outputs from the spectrometers 203, and provide the UV and/or visible light wavelength information to the analysis process.

At 210, the monitoring computing device 150, as part of the analysis process, may determine the infrared signal intensity and difference between any two of the received optical signals. For instance, the intensities of the infrared signals received through the optical fibers may be determined and compared to determine the melt pool geometry, which may be indicative of weld irregularities. As one example, the monitoring program may compare the measured optical information for each of the received optical signals with the optical information for each of the other optical signals received in the same timeframe to determine whether there are any significant differences in the infrared signal intensity of any of the optical signals as compared with any of the other optical signals from the same timeframe.

At 212, the monitoring computing device 150, as part of the analysis process, may determine ultraviolet and/or visible signal emission intensity and the difference between any two optical signals. For instance, the emission intensities of the ultraviolet and/or visible signals received through the optical fibers may be determined and compared to determine any abnormal arc conditions, such as arc blow, which may lead to skewed welds, improperly shaped welds, or other weld irregularities. As one example, the monitoring program may compare the measured optical information for each of the received optical signals with the optical information for each of the other optical signals received in the same timeframe to determine whether there are any significant differences in the UV light and/or visible light emission intensity of the optical signals as compared with any of the other optical signals from the same timeframe.

In some examples, the intensity of a certain wavelength or the average intensity integral from a certain range of wavelength may be compared as discussed additionally below, e.g., with respect to FIGS. 14A-15B. As for the threshold setting, this may be determined based on comparing received optical signal data with empirically determined good and defective. In some cases, the accepted ranges data structure 164 may include a database with monitored data information and weld quality information. Further in some examples, the monitoring program 160 may include, or may access, a system training or machine learning process that may be performed so that the monitoring program can make a decision regarding weld quality when data is received as the welding is being performed. Thus, the threshold difference between two optical signals of two different optical fibers may be the acceptable difference between the detected intensities in some examples, i.e., if the difference is greater than the threshold, the weld is irregular or otherwise may be determined to be defective.

At 214, the monitoring computing device 150 may, as part of the analysis process, determine whether the arc is normal based on the comparing performed at 212. For example, if one or more of the signals is significantly different from the other signals by a threshold amount then this may be indicative that the arc is not normal. For example, the use of arc welding for mass production faces the challenge of maintaining arc stability and resultant process robustness. The status of the arc may be affected by a multitude of factors including input voltage, power, electrode tip angle, workpiece variations, environmental factors, and so forth. If any of these factors are outside of normal specifications, an abnormality in the arc may occur, such as change in arc length, radius, intensity, and deflection. Because normalcy of the arc determines the amount of heat and the distribution of the heat on the workpiece at the weld location, an irregular arc may result in an irregular weld.

At 216, the computing device may, as part of the analysis process, determine whether the melt pool geometry is normal based on the comparing performed at 210. For example, if one or more of the signals is significantly different from the other signals, such as by a threshold amount, then this may be indicative that the melt pool geometry is not normal.

At 218, if the monitoring computing device 150 determines that the arc is not normal at 214, or that the melt pool geometry is not normal at 216, the monitoring computing device 150 may provide a notification to an operator of the welding equipment. For instance, the notification may be provided by any suitable means such as by causing an alert to sound either at the monitoring computing device 150, or at the welder controller 170, presenting a notification on a display associated with the monitoring computing device 150 or the welder controller 170, sending a text message or voicemail to a mobile device associated with the operator, causing other visible and/or audible notification, or the like.

At 220, in addition to, or as an alternative to, the operation at 218, if the monitoring computing device 150 determines that the arc is irregular (not normal) at 214, or that the melt pool geometry is irregular (not normal) at 216, the monitoring computing device 150 may send a signal to the welder controller 170 to cause the welder controller to change at least one welding parameter of the welder. In some examples, the signal sent by the monitoring computing device 150 may merely include a result of the analysis indicating an irregular (not normal) arc or irregular (not normal) melt pool geometry. In other examples, the signal sent by the monitoring computing device 150 may include an instruction to the welder controller 170 to change at least one specified parameter of the welding tool. For instance, the signal sent by the monitoring computing device 150 may instruct the welder controller 170 to change the amount of current provided to the welding tool to a specified amount, change a position of the welding tool with respect to the workpiece to a specified position, or the like.

At 222, the welder controller 170 may change at least one welding parameter of the welder in response to the received signal received from the monitoring computing device 150. For example, based on the signal received from the monitoring computing device 150, the welder controller 170 may change one or more parameters to control the welding arc, such as by changing an amount of current or voltage supplied to the welding electrode, or the like. Additionally, or alternatively, the welder controller may change one or more parameters to control the position of the welding tool, such as by controlling a position of one or more actuators that control the position of the welding tool and welding electrode with respect to the workpiece. In some examples, the welder controller 170 may perform a repair such as by re-executing the weld to address one or more irregularities with the weld.

As indicated at 224, if the arc is determined to be normal at 214, and the melt pool geometry is determined to be normal at 216, the welder controller 170 may continue to perform the welding process as indicated at 202. In some examples, a signal may be sent to the welder controller 170 by the monitoring computing device 150 to indicate that operation is normal; however, in other examples, a signal might not be employed.

FIG. 3 is a flow diagram illustrating an example process 300 according to some implementations. In some examples, the process may be an algorithm executed in part by the optical signal receiving apparatus 140, in part by the computing device 150, and in part by the welder controller 170 to monitor and control the arc and weld geometry of welds, such as spot welds, using optical signals received from multiple optical fibers during automated welding. The process 300 differs from the process 200 at least by the use of physical beam splitters and physical light filters, whereas in the process 200, spectrometers are used and the resulting signals are "filtered" virtually by the processor of the monitoring computing device 150 by identifying and determining the wavelengths of interest from the optical signal information provided by the spectrometers.

At 302, the welder controller 170 may perform a welding process. For example, the welder controller 170 may initiate a welding process on a workpiece or may continue a welding process on a workpiece.

At 304, the optical signal receiving apparatus 140 may acquire signals from the optical fibers. For example, during the welding, the optical fibers may receive electromagnetic radiation emitted in wavelengths of ultraviolet light, visible light, and infrared light emitted by the arc and the weld area, and may transmit these wavelengths along the optical fibers to the optical signal receiving apparatus 140. Accordingly, in this example, suppose that there are four optical fibers, as in the example of FIG. 1 discussed above, and therefore the optical signal receiving apparatus 140 may acquire a first optical single 136(1), a second optical signal 136(2), a third optical signal 136(3), and a fourth optical signal 136(4).

At 306, the optical signal receiving apparatus 140 may receive the optical signals 136 from the optical fibers and may split each of the optical signals 136 into two distinct optical signals using one or more beam splitters 303 included in the optical signal receiving apparatus 140. In this example, suppose that there is a beam splitter 303 corresponding to each received optical signal 136, such as a first beam splitter 303(1), a second beam splitter 303(2), a third beam splitter 303(3), and a fourth beam splitter 303(4), to receive the optical signals 136(1)-136(4), respectively. The beam splitters 303 receive the respective optical signals 136 and split each of the received optical signals 136 to provide a first portion of the received optical signal 136 to a first filter 305(1) and a second portion of the received optical signal 136 to a second filter 305(2).

At 308, the optical signal receiving apparatus 140 may filter and sense the optical signals to determine optical information to provide to the monitoring computing device 150. Accordingly, a first filter 305(1) may filter out wavelengths other than infrared wavelengths. The first filter 305(1) may provide the infrared light to a first light sensor 307(1) that measures the infrared signal intensity of the received optical signals 136(1)-136(4) for each of the optical fibers. Similarly, a second filter 305(2) may filter out wavelengths other than ultraviolet wavelengths and/or visible light wavelengths. The second filter 305(2) may provide the ultraviolet light and/or visible light to a second light sensor 307(2) that measures the emission intensity of the ultraviolet light and/or visible light received in the optical signals 136(1)-136(4) for each of the optical fibers, respectively. The first sensor 307(1) and the second sensor 307(2) may provide the optical information measured by the sensors 307 to the monitoring computing device 150.

At 310, the monitoring computing device 150 may, as part of the analysis process, determine the infrared signal intensity and difference between any two of the received optical signals. For instance, the intensities of the infrared signals received through the optical fibers may be determined and compared to determine the melt pool geometry, which may be indicative of weld irregularities. As one example, the monitoring program may compare the measured optical information for each of the received optical signals with the optical information for each of the other optical signals received in the same timeframe to determine whether there are any significant differences in the infrared signal intensity of any of the optical signals as compared with any of the other optical signals from the same timeframe.

At 312, the monitoring computing device 150 may, as part of the analysis process, determine ultraviolet and/or visible signal emission intensity and the difference between any two optical signals. For instance, the emission intensities of the ultraviolet and/or visible signals received through the optical fibers may be determined and compared to determine any abnormal arc conditions, such as arc blow, which may lead to skewed welds, improperly shaped welds, or other weld irregularities. As one example, the monitoring program may compare the measured optical information for each of the received optical signals with the optical information for each of the other optical signals received in the same timeframe to determine whether there are any significant differences in the UV light and/or visible light emission intensity of the optical signals as compared with any of the other optical signals from the same timeframe.

At 314, the monitoring computing device 150 may, as part of the analysis process, determine whether the arc is normal based on the comparing performed at 312. For example, if one or more of the signals is significantly different from the other signals by a threshold amount then this may be indicative that the arc is not normal. For example, the use of arc welding for mass production faces the challenge of maintaining arc stability and resultant process robustness. The status of the arc may be affected by a multitude of factors including input voltage, power, electrode tip angle, workpiece variations, environmental factors, and so forth. If any of these factors are outside of normal specifications, an abnormality in the arc may occur, such as change in arc length, radius, intensity, and deflection. Because normalcy of the arc determines the amount of heat and the distribution of the heat on the workpiece at the weld location, an irregular arc may result in an irregular weld.

At 316, the computing device may, as part of the analysis process, determine whether the melt pool geometry is normal based on the comparing performed at 310. For example, if one or more of the signals is significantly different from the other signals, such as by a threshold amount, then this may be indicative that the melt pool geometry is not normal.

At 318, if the monitoring computing device 150 determines that the arc is irregular (not normal) at 314, or that the melt pool geometry is irregular (not normal) at 316, the monitoring computing device 150 may provide a notification to an operator of the welding equipment. For instance, the notification may be provided by any suitable means such as by causing an alert to sound either at the monitoring computing device 150, or at the welder controller 170, presenting a notification on a display associated with the monitoring computing device 150 or the welder controller 170, sending a text message or voicemail to a mobile device associated with the operator, causing other visible and/or audible notification, or the like.

At 320, in addition to, or as an alternative to, the operation at 318, if the monitoring computing device 150 determines that the arc is irregular (not normal) at 314, or that the melt pool geometry is irregular (not normal) at 316, the monitoring computing device 150 may send a signal to the welder controller 170 to cause the welder controller to change at least one welding parameter of the welder. In some examples, the signal sent by the monitoring computing device 150 may merely include a result of the analysis indicating an abnormal arc or abnormal melt pool geometry. In other examples, the signal sent by the monitoring computing device 150 may include an instruction to the welder controller 170 to change at least one specified parameter of the welding tool. For instance, the signal sent by the monitoring computing device 150 may instruct the welder controller 170 to change the amount of current provided to the welding tool to a specified amount, change a position of the welding tool with respect to the workpiece to a specified position, or the like.

At 322, the welder controller 170 may change at least one welding parameter of the welder in response to the received signal received from the monitoring computing device 150. For example, based on the signal received from the monitoring computing device 150, the welder controller 170 may change one or more parameters to control the welding arc, such as by changing an amount of current or voltage supplied to the welding electrode, or the like. Additionally, or alternatively, the welder controller may change one or more parameters to control the position of the welding tool, such as by controlling a position of one or more actuators that control the position of the welding tool and welding electrode with respect to the workpiece. In some examples, the welder controller 170 may perform a repair such as by re-executing the weld to address one or more irregularities with the weld.

As indicated at 324, if the arc is determined to be normal at 314, and the melt pool geometry is determined to be normal at 316, the welder controller 170 may continue to perform the welding process as indicated at 302. In some examples, a signal may be sent to the welder controller 170 by the monitoring computing device 150 to indicate that operation is normal; however, in other examples, a signal might not be employed.

Some implementations herein, such as those described above with respect to FIGS. 1-3 may focus on the welding arc and the weld geometry of welds, such as spot welds, as well as other types of welds, using multiple optical fibers as sensors during automatic welding. The examples herein may include comparing electromagnetic radiation signals received through these multiple optical fibers for detecting any differences that exceed a threshold difference to determine whether the weld geometry is irregular and/or to detect any arc irregularities, such as arc blow, during welding. Thus, some examples compare received optical signal intensities in the infrared range, the ultraviolet range and/or the visible light range to determine weld pool/weld bead geometry and/or weld arc configuration.

FIGS. 4A-4D illustrate example optical fiber placement locations according to some implementations. In the example of FIG. 4A, similar to the example discussed above with respect to FIG. 1, the optical fibers 132 may be embedded in the collet 130 such as by being disposed in through holes 402 formed in the collet 130. Accordingly, in this example, optical fibers 132(1) through 132(4) are symmetrically arranged around the welding electrode 110 (e.g., radially symmetrical around the center of the welding electrode), and disposed in and supported by the collet 130.

FIG. 4B illustrates a cross-section of the example of FIG. 4A, as viewed along line 4B-4B of FIG. 4A. The example of FIG. 4B illustrates that the optical fibers 132 are symmetrically arranged around the welding electrode 110. Accordingly, if the arc generated by the welding electrode is skewed to one side of the weld electrode 110, such as due to arc blow, then one of the optical fibers will receive the light of a greater intensity than an optical fiber on the opposite side of the welding electrode 110. Similarly, if a weld pool and/or weld bead generated during the welding is asymmetrical in an unexpected manner then the intensity of light received by one of the optical fibers 132(1)-132(4) will be different from that received by one or more other ones of the optical fibers 132(1)-132(4).

FIG. 4C illustrates an example in which three optical fibers are arranged symmetrically around the welding electrode 110 and disposed in the collet 130 in through holes 402 in the collet 130. FIG. 4D illustrates a cross-section of the example of FIG. 4C, as viewed along line 4D-4D of FIG. 4C. The example of FIG. 4D illustrates that the optical fibers 132 are symmetrically arranged around the welding electrode 110. Accordingly, if the arc generated by the welding electrode is skewed to one side of the weld electrode 110, such as due to arc blow, then one of the optical fibers will receive the light of a greater intensity than an optical fiber on the opposite side of the welding electrode 110. Similarly, if a weld pool and/or weld bead generated during the welding is asymmetrical in an unexpected manner then the intensity of light received by one of the optical fibers 132(1)-132(3) will be different from that received by one or more other ones of the optical fibers 132(1)-132(3).

FIGS. 5A-5D illustrate example optical fiber placement locations according to some implementations. In the examples of FIGS. 5A-5D, the optical fibers are disposed on the outside of the gas nozzle 104. As an example, this configuration may be used in situations in which perforation of nozzle 104 or collet 130 is not desired or is not practical. One such example might be in the case that the welding tool 102 is of a small size. Furthermore, in some examples, an additional cooling medium (not shown in FIGS. 5A-5D) may be utilized to prevent heat damage to the optical fibers.

In the example of FIG. 5A, the optical fibers 132 may be disposed around the outside of the tool nozzle 104. Furthermore, while the optical fibers are shown truncated in these and other illustrations herein for convenience of illustration, it is to be understood that the optical fibers 132 may extend along the housing 106 to the optical signal receiving apparatus 140 discussed above, and, e.g., as illustrated in FIG. 1. The optical fibers may be adhered to the nozzle 104 and tubular body 106 using any suitable technique such as adhesive, mechanical fasteners, integrally formed connectors, or the like.

FIG. 5B illustrates a cross-section of the example of FIG. 5A, as viewed along line 5B-5B of FIG. 5A. The example of FIG. 5B illustrates that the optical fibers 132 are symmetrically arranged around the exterior surface of the nozzle 104. Furthermore, while all four optical fibers 132(1)-132(4) are visible in the view of FIG. 5B, only optical fibers 132(1) and 132(3) are visible in the view of FIG. 5A.

FIG. 5C illustrates an example in which three optical fibers 132 are arranged symmetrically around the exterior of the nozzle 104. FIG. 5D illustrates a cross-section of the example of FIG. 5C, as viewed along line 5D-5D of FIG. 5C. The example of FIG. 5D illustrates that the optical fibers 132 are symmetrically arranged around the outside of the nozzle 104 and the welding tool body 106. Furthermore, while three optical fibers 132(1)-132(3) are visible in the view of FIG. 5D, only optical fibers 132(1) and 132(3) (shown partially in hidden lines) are visible in the view of FIG. 5C.

FIGS. 6A-6D illustrate example optical fiber placement locations according to some implementations. In the examples of FIGS. 6A-6D, the optical fibers are disposed on the inside of the gas nozzle 104. As an example, this configuration may be used in situations in which perforation of the collet 130 is not desired or is not practical and placement of the optical fibers on the outside of the welding tool nozzle 104 is not desired. For example, in this implementation, the shielding gas may also serve as a coolant for the optical fibers, similar to some implementations discussed above.

Figure 6C:
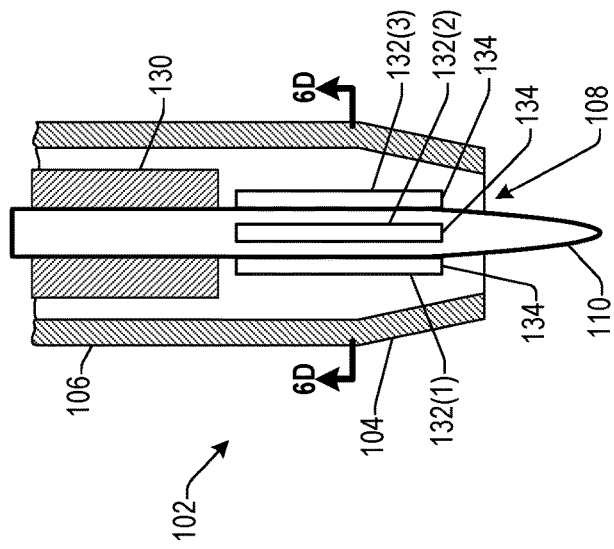
FIGS. 6A-6D illustrate example optical fiber placement locations according to some implementations.
Figure 6D:
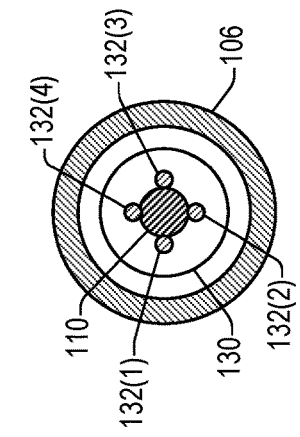
Figure 6A:
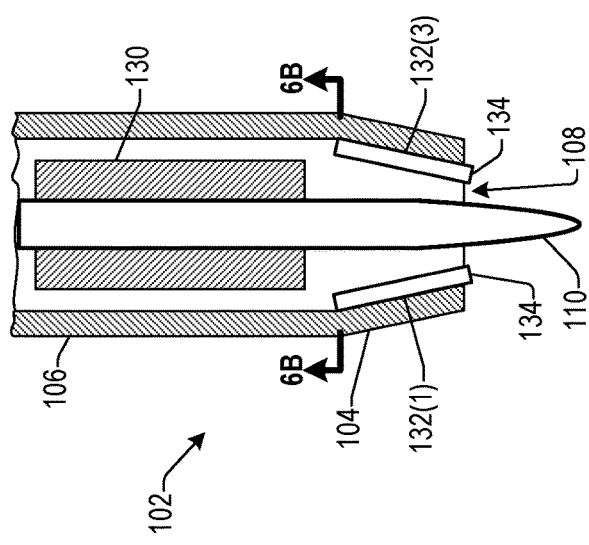

In the example of FIG. 6A, the optical fibers 132 may be disposed around the inside of the tool nozzle 104. Furthermore, while the optical fibers are shown truncated in these and other illustrations herein for convenience of illustration, it is to be understood that the optical fibers 132 may extend along the inside of housing 106 to the optical signal receiving apparatus 140 discussed above, similar to the example illustrated in FIG. 1. The optical fibers 132 may be adhered to the nozzle 104 and tubular body 106 using any suitable technique such as adhesive, mechanical fasteners, integrally formed connectors, or the like.

Figure 6B:
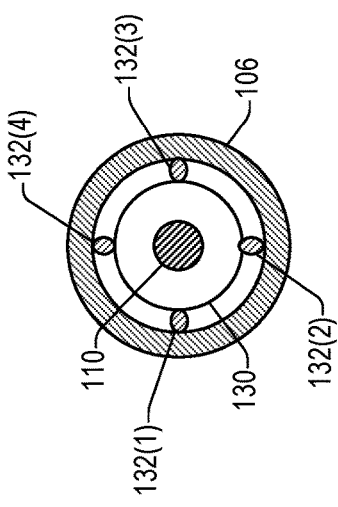

FIG. 6B illustrates a cross-section of the example of FIG. 6A, as viewed along line 6B-6B of FIG. 6A. The example of FIG. 6B illustrates that the optical fibers 132 are symmetrically arranged around the interior the nozzle 104. Furthermore, while four optical fibers 132(1)-132(4) are visible in the view of FIG. 6B, only optical fibers 132(1) and 132(3) are visible in the view of FIG. 6A.

FIG. 6C illustrates an example in which four optical fibers 132 are arranged symmetrically around the exterior of the welding electrode 110. FIG. 6D illustrates a cross-section of the example of FIG. 6C, as viewed along line 6D-6D of FIG. 6C. The example of FIG. 6D illustrates that the optical fibers 132 are symmetrically arranged around the outside of the welding electrode. Furthermore, while four optical fibers 132(1)-132(4) are visible in the view of FIG. 6D, only optical fibers 132(1), 132(2), and 132(3) are visible in the view of FIG. 6C. In some examples, the optical fibers may be maintained in place on the welding electrode 110 such as by one or more ring-shaped springs, one or more hose clamps, adhesive, or other suitable fasteners (not shown in FIGS. 6A and 6D).

For discussion purposes, some example optical fiber placements, such as attached to the collet 132, attached to the inside or the outside of the nozzle 104, attached to the welding electrode 110, etc., are described herein. However, placement of the optical fibers herein is not limited to the examples illustrated and described, and may be extended to other placement locations, such as integrated into the nozzle or welding tool body, any combination of the placement locations described, or other placement locations, as will be apparent to those of skill in the art having the benefit of the disclosure herein.

Furthermore, for some specific applications described herein, such as where a round spot weld is chosen, the optical fibers are illustrated as being uniformly and/or otherwise symmetrically distributed around the welding electrode 110 or the like. However, the number of optical fibers, and the distribution and arrangement of the optical fibers is not limited to symmetrical placement, and may be extended to non-uniform or otherwise non-symmetrical distribution. For example, the minimum number of optical fibers might be more than four in some cases, such as if the desired spot weld shape is desired to be irregular for certain applications, such as when welding workpieces having skewed or irregular shapes.

Figure 7:
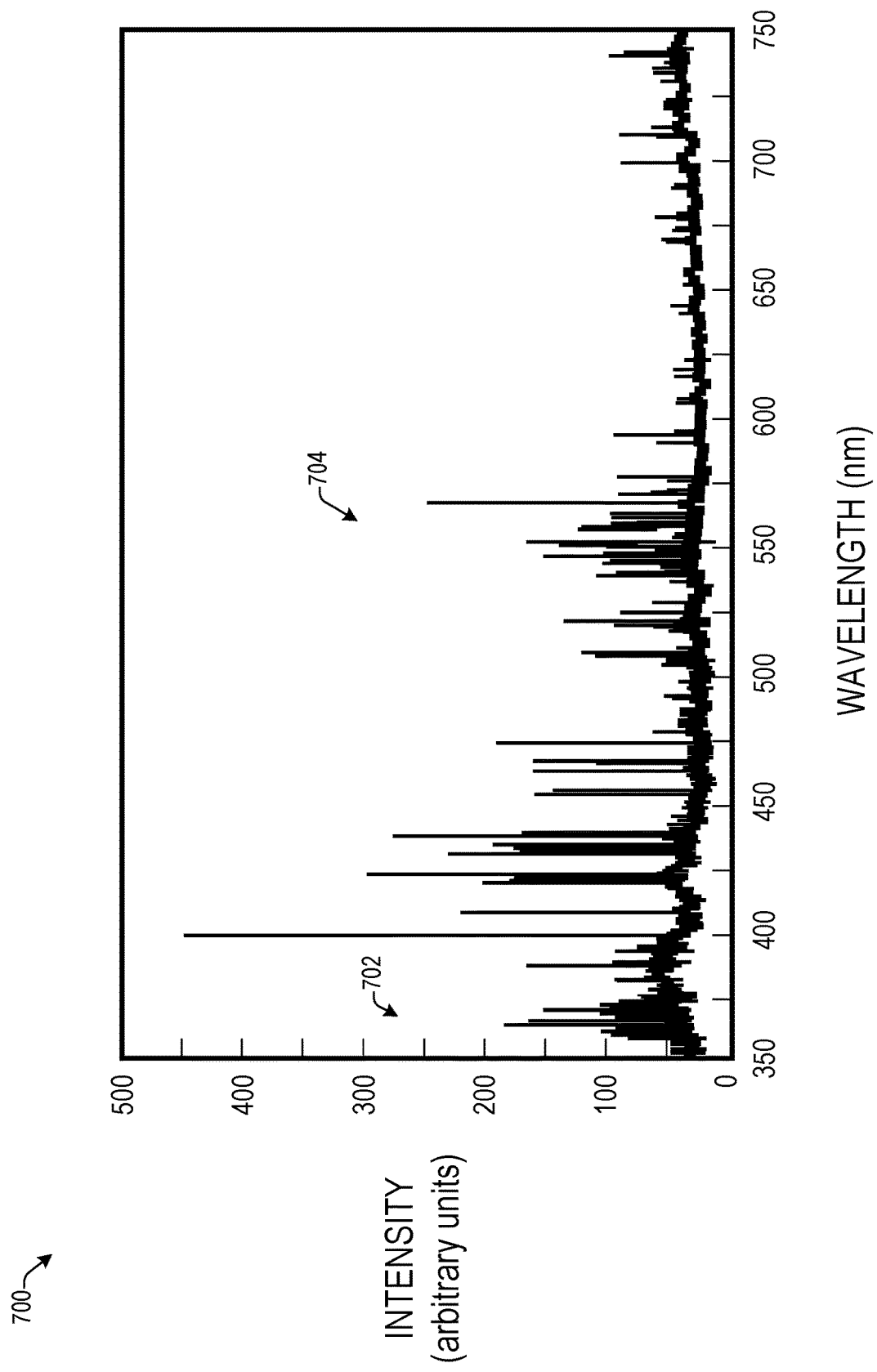
FIG. 7 illustrates an example graph of intensity versus wavelength according to some implementations.

FIG. 7 illustrates an example graph 700 of intensity versus wavelength according to some implementations. In this example, the graph 700 represents a typical arc radiation spectrum for TIG welding of mild steel. As shown in the graph 700, the optical signal detected from the arc is comprised wavelengths of light across a wide range of the spectrum from ultraviolet (e.g., less than 380 NM through the visible light spectrum (e.g., to 750 nm). The light spectrum of FIG. 7 represents light emitted by a developed arc and consists of a continuous spectrum and characteristic line spectrum. Most of the higher intensity radiation is located in the ultraviolet region 702 and the lower visible light region 704 between 380 and 600 nm.

Figure 8:
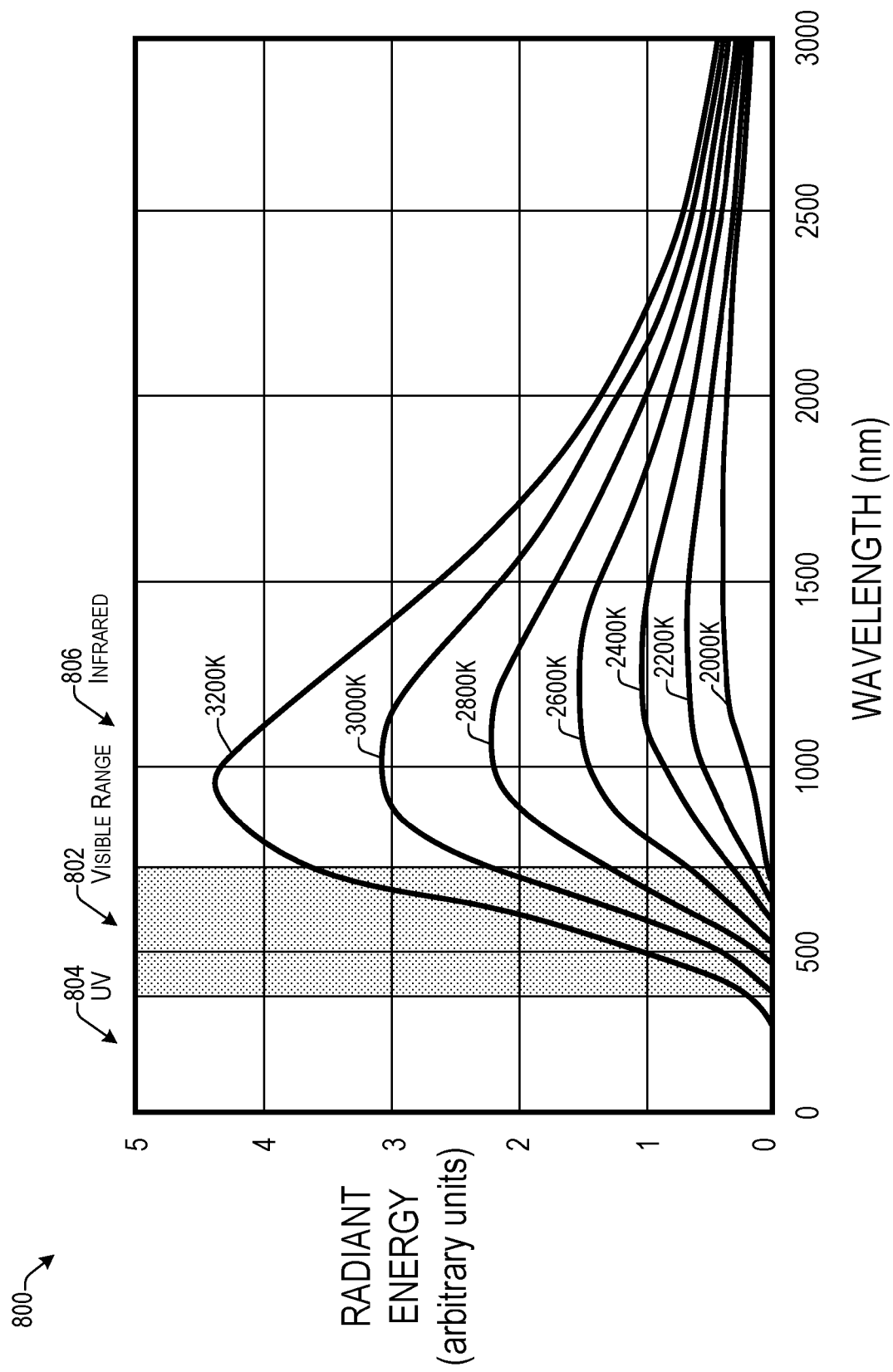
FIG. 8 illustrates an example graph of radiant energy versus wavelength according to some implementations.

FIG. 8 illustrates an example graph 800 of radiant energy versus wavelength according to some implementations. The range of visible light is shown as the shaded region at 802, with the ultraviolet range 804 being to the left of the visible range 802 and the infrared range 806 being to the right of the visible range 802. This graph represents typical black body radiant energy versus wavelength for body radiation from a weld pool. In this example, the radiant energy peaks in the near infrared range, e.g., between 750 and 1000 nm. Accordingly, determining weld pool properties in this range is closely related to the condition of a molten pool.

In the example of FIGS. 1-3, the optical signals received through the optical fibers may be filtered (either physically or virtually) into specific wavelength ranges. For instance, the ultraviolet and visible ranges of light may be sensitive to arc conditions, while the infrared range may be more sensitive to melt pool condition. As discussed above with respect to FIG. 3, beam splitters and physical optical filters are connected in series to the optical fibers to filter out ranges of electromagnetic radiation that are not as conducive to detection of the weld condition being detected. An alternate approach, as discussed with respect to FIG. 2, is to connect the optical fibers in series to spectrometers and subsequently use data processing as a way of virtually filtering the resulting data to isolated the specific wavelengths having light intensities of interests for the weld condition being detected (i.e., arc condition or weld pool condition).

In other examples, the monitoring system may also operate without filtering the light signals to isolate specific wavelength ranges. For instance, the whole spectrum may be collected by using spectrometers for each optical signal. As one example, a database may be established with acceptable and defective spectrum patterns. Accordingly, a received spectrum may be compared to the acceptable and defective spectrum patterns in the database to determine whether a weld or an associated arc is irregular.

In some examples, a machine learning model may be used to perform the spectrum comparison. For example, a machine learning model may be trained using the database of acceptable and defective spectrum patterns. Subsequently, newly received patterns received from a plurality of optical fibers may be provided to the machine learning model for matching or otherwise classify classifying otherwise matching the newly received patterns with an acceptable or defective spectrum pattern within a such as within a confidence level or the like. Examples of suitable machine learning models may include classification models such as random forest, support vector machines, or deep learning networks, such as a convolutional neural network. Additional examples of suitable machine learning models may include predictive models, decision trees, regression models, such as linear regression models, stochastic models, such as Markov models and hidden Markov models, artificial neural networks, such as recurrent neural networks, and so forth. Accordingly, implementations herein are not limited to a particular type of machine learning model.

FIGS. 9A-9D illustrate example weld geometries according to some implementations. FIG. 9A illustrates a top view of a workpiece 900 having an elliptical spot weld 902 formed thereon connecting a first workpiece portion 902 and a second workpiece portion 906. FIG. 9B illustrates a cross-sectional view of the workpiece 900 and elliptical spot weld 902, as viewed along line 9B-9B of FIG. 9A. In this example, the elliptical spot weld 902 is centered over a joint 908 between the first workpiece portion 904 and the second workpiece portion 906, and penetrates into the workpiece 900 to an intended distance to provide an example of a symmetrical, generally well-formed elliptical spot weld according to some implementations herein.

For detecting the weld quality of the elliptical spot weld 902, four symmetrically arranged optical fibers 132(1)-132(4) may be employed according to some examples herein as discussed above with respect to FIGS. 1-3. For example, during creation of the weld, the optical fibers 132(1)-132(4) may be generally positioned as shown with respect to the weld 902. Accordingly, by comparing the optical signal received from the first optical fiber 132(1) with the optical signal received from the third optical fiber 132(3), if the received optical signals are generally the same within an accepted threshold amount, then the weld is generally symmetrical. Similarly, if the optical signal received from the second optical fiber 132(2) is generally the same as the optical signal received from the fourth optical fiber 132(4), then this is also indicative that the weld is generally symmetrical. In addition, the optical signals received by the first and third optical fiber may have a higher intensity than the optical signals received by the second and fourth optical fibers, which is indicative of the elliptical shape. Further, by detecting the amount of intensity of the received light received by each optical fiber, when compared in comparison with reference radiant energy information, such as that set forth in the graph 800 of FIG. 8, it is possible to determine whether the melt pool achieved a sufficient temperature for proper formation of the weld at all four locations detected by the four optical fibers.

FIG. 9C illustrates a top view of the workpiece 900 having an circular spot weld 910 formed thereon connecting the first workpiece portion 904 and the second workpiece portion 906. FIG. 9D illustrates a cross-sectional view of the workpiece 900 and circular spot weld 910, as viewed along line 9D-9D of FIG. 9C. In this example, the circular spot weld 910 is centered over the joint 908 between the first workpiece portion 904 and the second workpiece portion 906, and penetrates into the workpiece 900 to an intended depth to provide an example of a symmetrical, generally well-formed circular spot weld according to some implementations herein.

For detecting the weld quality of the circular spot weld 910, three symmetrically arranged optical fibers 132(1)-132(3) may be employed according to some examples herein, e.g., similar to the examples discussed above with respect to FIGS. 1-3. For instance, during creation of the circular weld 910, the optical fibers 132(1)-132(3) may be generally positioned as shown with respect to the weld 910. Accordingly, by comparing the optical signals received by the first optical fiber 132(1) with the optical signals received by the second optical fiber 132(2) and the third optical fiber 132(3), and by also comparing the optical signals received by the second optical fiber 132(2) with the optical signals received from the third optical fiber 132(3), the symmetry of the circular spot weld 910 may be detected. Furthermore, if the radiant intensity detected by the optical fibers is generally the same then this is indicative that the circular weld 910 is indeed circular. Further, by detecting the amount of intensity of the received light received by each optical fiber, when compared in comparison with reference radiant energy information, such as that set forth in the graph 800 of FIG. 8, it is possible to determine whether the melt pool achieved a sufficient temperature for proper formation of the weld at all three locations detected by the three optical fibers.

FIGS. 10A-10B illustrate an example of weld geometry monitoring according to some implementations. FIG. 10A illustrates a cross-sectional side view of the welding tool 102 and the workpiece 900 with an irregular elliptical weld 1002 formed. FIG. 10B illustrates a top view of the workpiece 900 of FIG. 10A, with the line 10A-10A indicating the location of the cross-section of FIG. 10A with respect to the top view. FIGS. 10A and 10B illustrate a weld geometry irregularity due to the offset of the weld bead position with respect to the workpiece 900. The dashed line 1004 indicates the target weld location with respect to the workpiece 900.

In this example, an irregular weld pool formed during welding. As a result, the near infrared light signal detected by the optical fibers 132 has a non-symmetrical distribution on either side of the joint 908. For example, on the left side of the joint 908, there is an area 1006 of strong IR emission and on the right side of the joint 908 there is an area of low IR emission. The monitoring program can detect the difference using the techniques discussed above with respect to FIGS. 1-3, and alert the operator or send a control signal to the welder controller to automatically correct the weld, such as by adjusting the electrode position to compensate the offset. In addition, the monitoring system herein is able to detect other weld geometry irregularities, such as irregular size or shape in a similar manner based on the detected IR emission.

FIGS. 11A-11B illustrate an example of monitoring arc blow according to some implementations. FIG. 11A illustrates a cross-sectional side view of the welding tool 102 and the workpiece 900 with an irregular weld 1102 formed. FIG. 11B illustrates a top view of the workpiece 900 of FIG. 11A, with the line 11A-11A indicating the location of the cross-section of FIG. 11A with respect to the top view. FIGS. 11A and 11B illustrate a weld irregularity due to arc blow. The circular dashed line 1004 indicates the target weld location and geometry with respect to the workpiece 900.

In this example, arc blow occurred, as indicated by the irregular arc resulting in the irregularly formed weld 1102.

Arc blow (also referred to as "arc wander") is an undesired welding condition that results due to an unbalanced magnetic field or a thermal effect. When arc blow occurs, the arc may deflect from the shortest path, which is the vertical direction in FIG. 11A. The consequence is a defective weld, such as the skewed weld illustrated in FIG. 11B.

The arc generates radiation in a spectrum range mainly in the ultraviolet and visible range, as discussed above with respect to FIG. 7. The ultraviolet and visible light received by each optical fiber during the welding is analyzed to detect whether there is any significant arc blow behavior, and if so, the deflection direction. In addition, to detecting arc blow, implementations herein may also detect other arc conditions through the techniques discussed above, such as abnormal arc output due to improper current or voltage, due to electrode wear, or the like.

Figure 12:
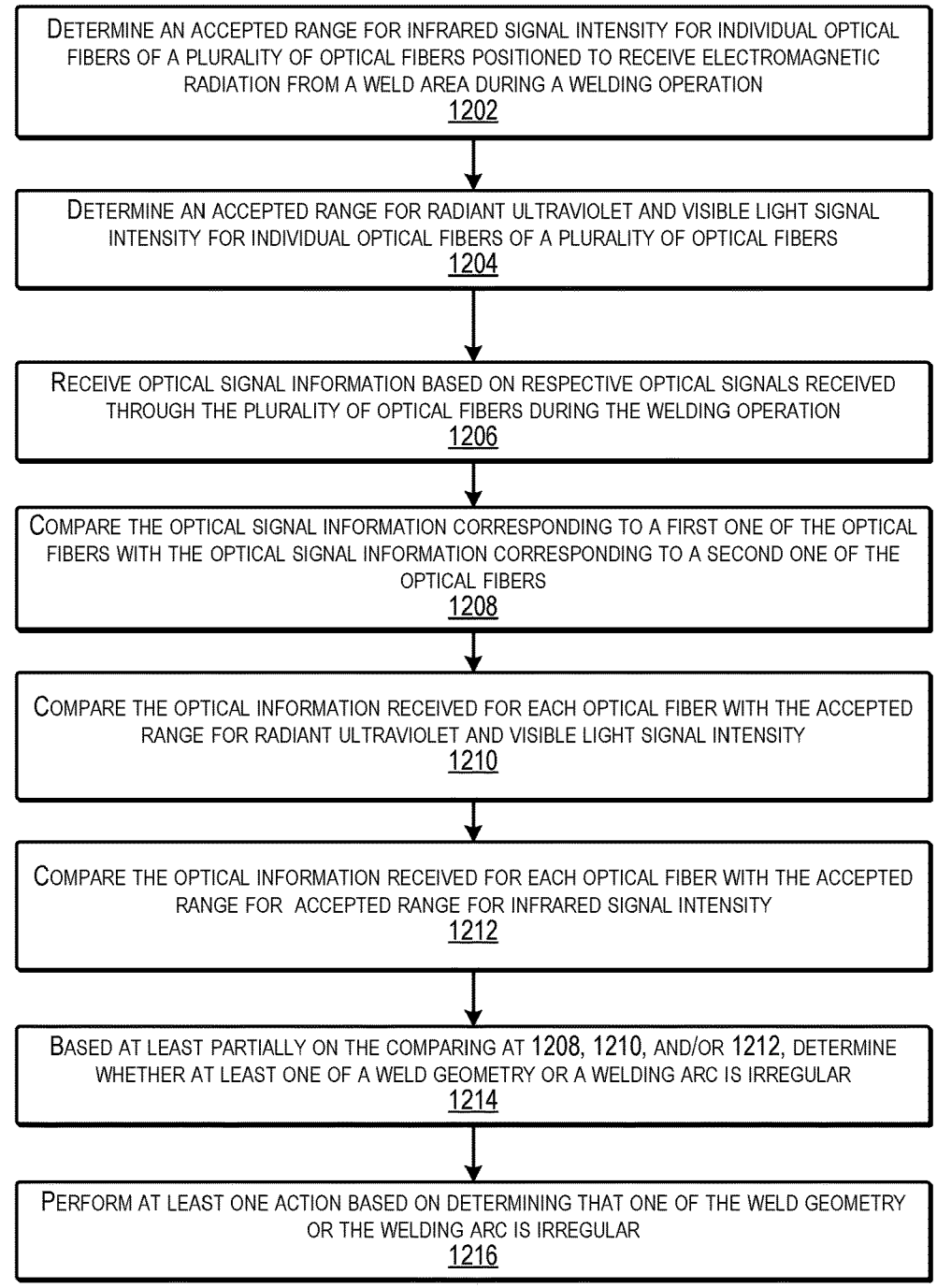
FIG. 12 is a flow diagram illustrating an example process according to some implementations.

FIG. 12 is a flow diagram illustrating an example process 1200 according to some implementations. The process is illustrated as a collection of blocks in a logical flow diagram, which represent a sequence of operations. The order in which the blocks are described should not be construed as a limitation. In some cases, the described blocks can be combined, performed in a different order, and/or performed in parallel to implement the process, or alternative processes, and not all of the blocks need be executed. For discussion purposes, the process is described with reference to the environments and apparatus described in the examples herein, although the process may be implemented in a variety of other environments and apparatuses. In some examples, the process may be executed, at least partially, by the monitoring computing device 150 (and/or welder controller 170) discussed above with respect to FIG. 1.

At 1202, the computing device may determine an accepted range for infrared signal intensity for individual optical fibers of a plurality of optical fibers positioned to receive electromagnetic radiation from a weld area during a welding operation. For example, the accepted range may have been determined empirically in advance, and may be stored in an accepted ranges data structure in a storage location accessible to the computing device, such as discussed above with respect to FIG. 1.

At 1204, the computing device may determine an accepted range for radiant ultraviolet and visible light signal intensity for individual optical fibers of a plurality of optical fibers. For example, the accepted range may have been determined empirically in advance, and may be stored in a storage location accessible to the computing device.

At 1206, the computing device may receive optical signal information based on respective optical signals received through the plurality of optical fibers during the welding operation. As describe above with respect to FIGS. 1-3, an optical signal receiving apparatus may receive the optical signals from the optical fibers and may output optical signal information, which may be digital information about the received optical signals indicating ultraviolet, visible, and infrared electromagnetic radiation intensities received by the respective optical fibers from the weld area during the welding operation.

At 1208, the computing device may compare the optical signal information corresponding to a first one of the optical fibers with the optical signal information corresponding to a second one of the optical fibers. In some cases, the computing device may compare the received optical signal information for each optical fiber with each of the other optical fibers to determine whether the differences exceed an accepted threshold difference. If the difference exceeds the threshold then the welding, such as a weld geometry or a welding arc, may be determined to be irregular.

At 1210, the computing device may compare the optical information received for each optical fiber with the accepted range for radiant ultraviolet and visible light signal intensity. In some cases, the computing device may access an accepted ranges data structure for making the comparison. If the optical information for any of the optical fibers is outside the accepted range, the weld may be determined to be irregular.

At 1212, the computing device may compare the optical information received for each optical fiber with the accepted range for infrared signal intensity. In some cases, the computing device may access an accepted ranges data structure for making the comparison. If the optical information for any of the optical fibers is outside the accepted range, the weld may be determined to be irregular.

At 1214, based at least partially on the comparing at 1208, 1210, and/or 1212, the computing device may determine whether at least one of a weld geometry or a welding arc is irregular.

At 1216, the computing device may perform at least one action based on determining that one of the weld geometry or the welding arc is irregular.

Figure 13:
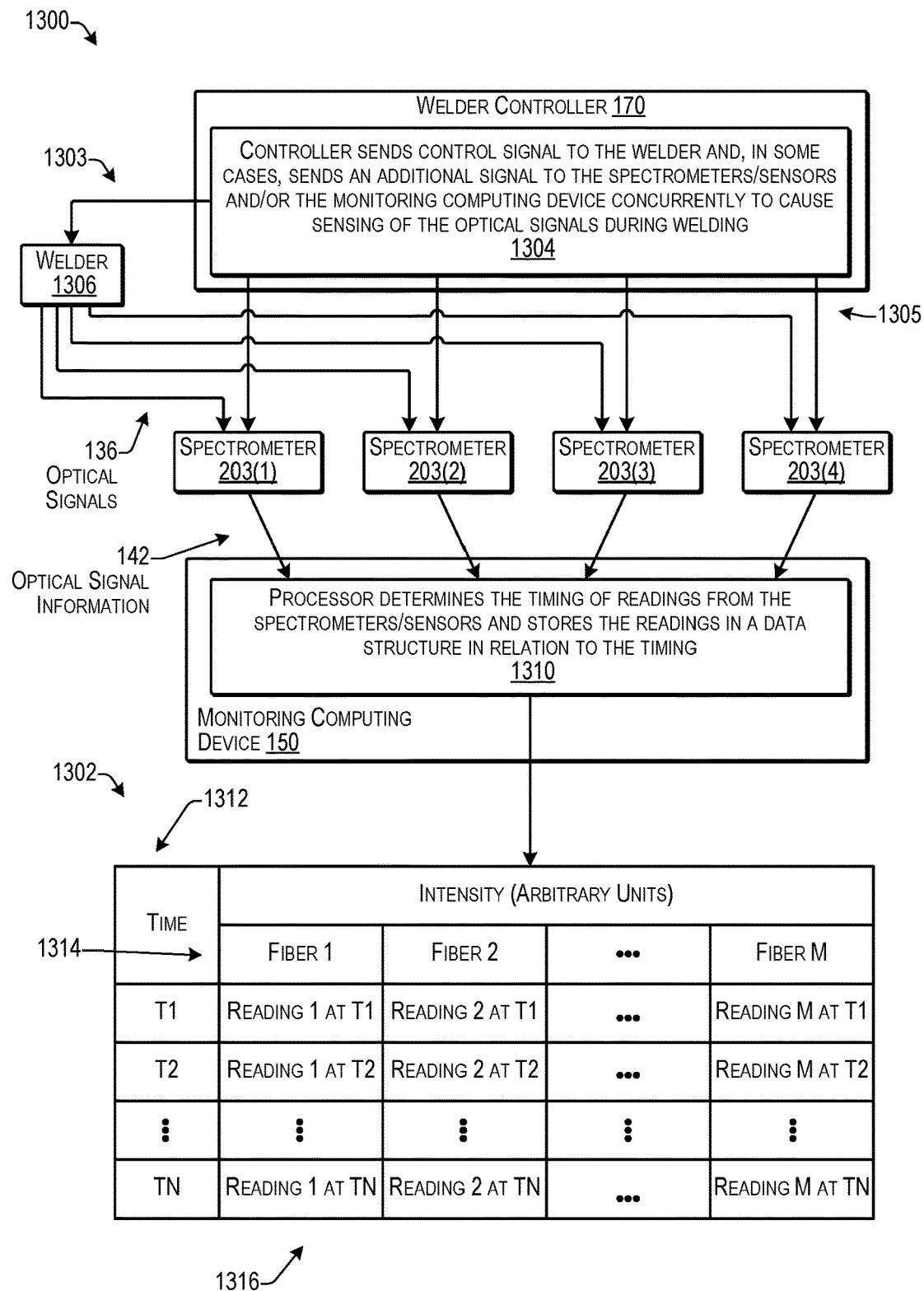
FIG. 13 is a flow diagram illustrating an example process according to some implementations.

FIG. 13 is a flow diagram illustrating an example process 1300 according to some implementations. In this example, the optical signals 136 are correlated according to a time at which the optical signals 136 are received. The sensor readings determined from the optical signals 136 are subsequently stored in a data structure 1302 for analysis. Accordingly, in some examples, the process 1300 may be executed at least partially by the processor(s) 152 on the monitoring computing device 150 discussed above with respect to FIGS. 1-3 by executing instructions from the monitoring program 160. Further, in some examples, the process 1300 may be executed at least partially by the welder controller 170 discussed above or other computing device, such as a robotic controller, or the like.

At 1304, the welder controller 170 may send a control signal 1303 to a welder 1306 and, in some cases, sends an additional signal 1305 concurrently to the spectrometers 203 (or sensors 307 in the case of the embodiment of FIG. 3—not shown in FIG. 13) and/or to the monitoring computing device 150 to cause sensing of the optical signals 136 during welding. The welder controller 170 may be caused to initiate welding manually by an operator. Alternatively, the welding may be initiated by the monitoring computing device 150, may be initiated by software executed by the welder controller 170, or may be initiated by another computing device, such as a robotic controller. As one example, the welding may be initiated by the monitoring program on the monitoring computing device 150, which causes the welder controller 170 to send the control signal 1303 to the welder 1306. As another example, software executed by the welder controller 170 may send the control signal 1303 to initiate the welding process and may further send the control signals 1305 to cause the spectrometers 203 (or sensors 307) to read the optical signals received by the optical fibers from the welding area, as discussed above with respect to FIGS. 1-3.

As another example, the monitoring computing device 150 may receive the control signal 1305 from the welder controller and may communicate with the spectrometers 203 to receive readings from the spectrometers 203 as the optical signal information 142. Alternatively, in the case that the monitoring computing device 150 causes the welder controller 170 to initiate the welding, the monitoring computing device 150 may also communicate with the spectrometers 203 for receiving optical information from the spectrometers 203 (or sensors 307, depending on the implementation). In some examples, the spectrometers 203 (or sensors 307) may sample the received signal according to the same data collection frequency, which may be controlled by the spectrometers 203 themselves or the processor(s) of the monitoring computing device 150.

At 1310, the monitoring computing device processor determines the timing of readings from the spectrometers/sensors and stores the readings in a data structure in relation to the timing. As one example, a timestamp may be associated and stored with each reading from each spectrometer 203 in the data structure 1302 for a corresponding optical fiber identifier (ID). In this example, the data structure 1302 may store the time 1312 for each reading, such as T1, T2, . . . , TN, and fiber IDs 1314, such as Fiber 1, Fiber 2, . . . , Fiber M, which may correspond to the fibers providing optical signals 136 to the spectrometers 203(1)-203(4) in this example, or to the sensors 307 in other examples. As indicated at 1316, for each fiber ID 1314 and for each time interval 1312, the data structure 1302 may store an intensity reading determined from the corresponding optical signal read by the respective spectrometer or sensor. The monitoring computer may subsequently use the stored readings for performing analysis of the weld in real time. In some examples, the data structure 1302 may be a portion of and/or may be included in the weld log data structure 162 discussed above with respect to FIG. 1.

Figure 14A:
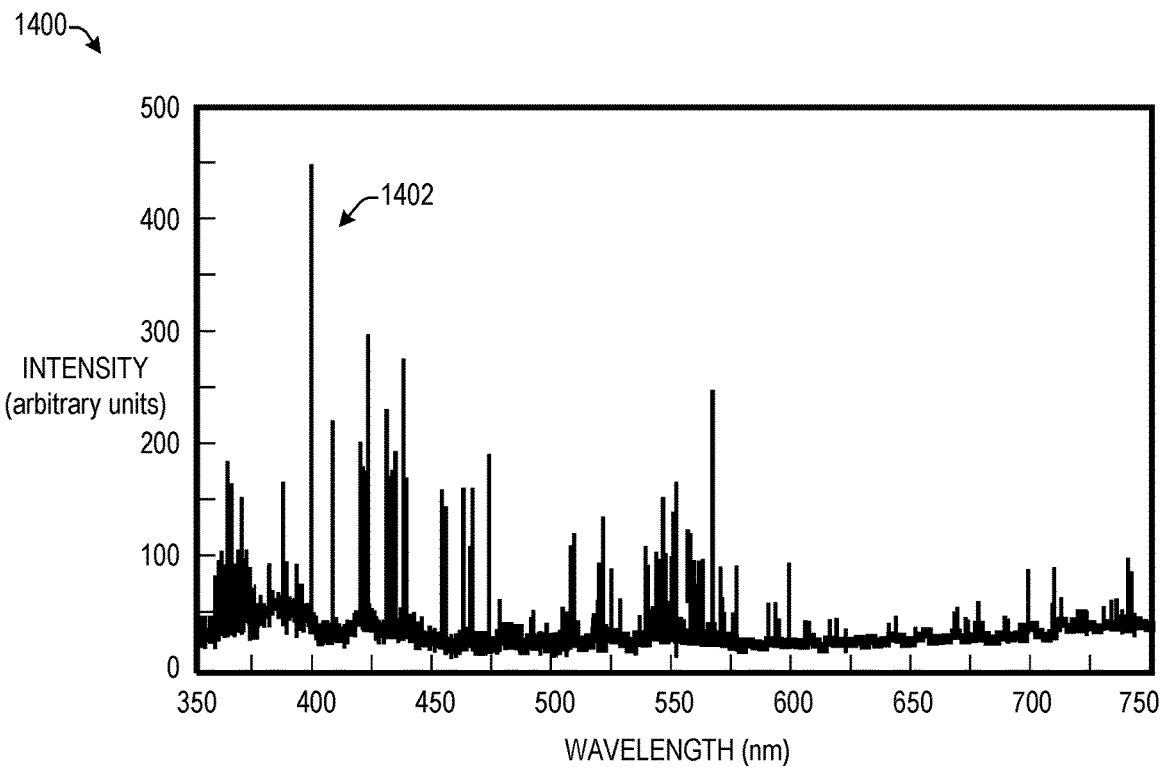
FIGS. 14A-14B illustrate examples of determining signal intensities from different optical signals according to some implementations.
Figure 14B:
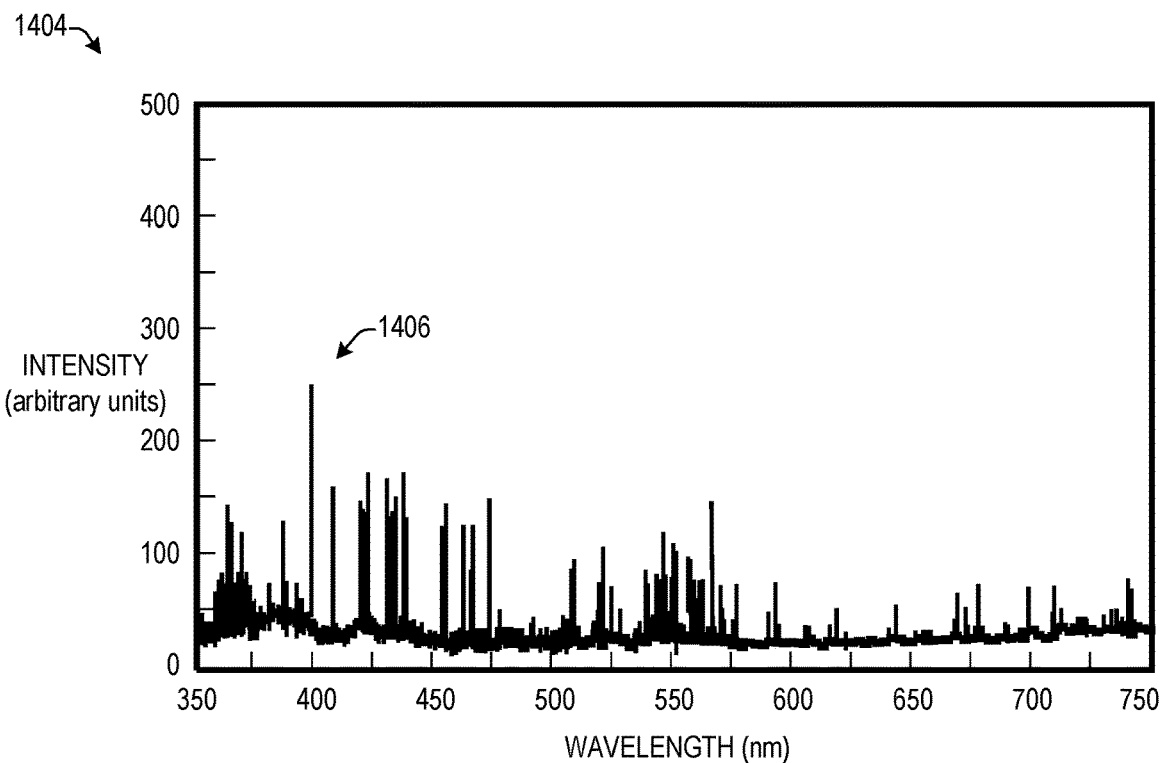

FIGS. 14A-14B illustrate examples of determining signal intensities from different optical signals according to some implementations. For instance, the detected intensity may be determined at certain wavelengths for each optical fiber ID from the data structure 1302 discussed above with respect to FIG. 13. Each optical fiber ID may be corresponded to a location on the welding tool, the weld, or the like, for detecting optical signals from a portion of the weld being formed and related the respective optical signals to the respective portion of the weld.

In the example of FIG. 14A, suppose that for the time T2 of FIG. 13, the spectrometer 203(1) received a signal from optical fiber 1 to provide the intensity graph 1400. In this case, suppose that the intensity of the signal at a wavelength of 400 nm is 450 au, as indicated at 1402. Further in the example of FIG. 14B, suppose that, for the same time T2, the spectrometer 203(2) received a signal from optical fiber 2 to provide the intensity graph 1404. In this case, suppose that the intensity of the signal at the wavelength of 400 nm is 250 au, as indicated at 1406.

In some cases, these intensities may be compared with each other to determine whether they are within a threshold of each other to indicate whether the weld is acceptable or irregular. Additionally, or alternatively, the measured intensities for each fiber ID may be compared an accepted range for that fiber ID specified with the accepted range data structure 164 of empirically determined ranges to determine whether the measured intensities are within the determined ranges for the corresponding time and weld location. Further, while 400 nm is used as an example wavelength for comparison in this example, implementations herein are not limited to a particular wavelength.

Figure 15A:
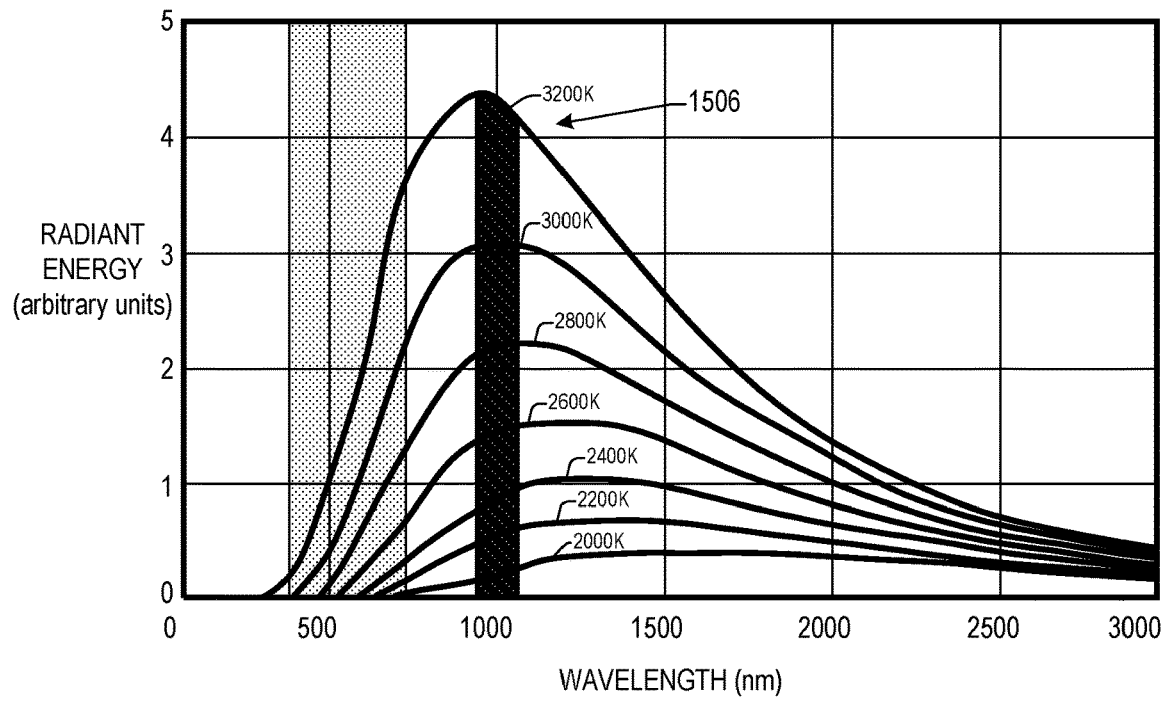
FIGS. 15A-15B illustrate examples of determining average signal intensities from different optical signals according to some implementations.
Figure 15B:
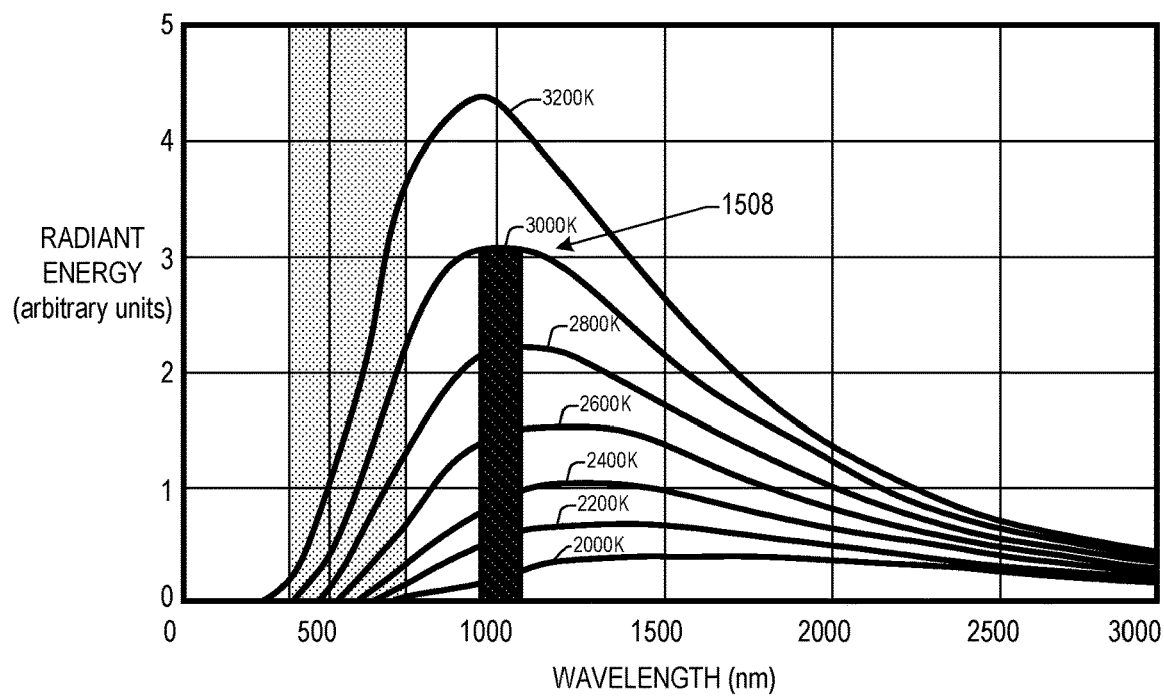

FIGS. 15A-15B illustrate examples of determining average signal intensities from different optical signals according to some implementations. Similar to the example of FIGS. 14A-14B discussed above, in this example, supposed that graph 1500 of FIG. 15A represents a first optical signal reading from optical fiber 1, and graph 1502 of FIG. 15B represents a second optical signal reading from optical fiber 2. In graph 1500, supposed that the radiant energy at a 1000 nm range has an average intensity of about 4 au, as indicated at 1506, whereas in graph 1502, the radiant energy at a 1000 nm range has an average intensity of about 3 au, as indicated at 1508.

In some cases, these average intensities may be compared with each other to determine whether they are within a threshold of each other to indicate whether the weld is acceptable or irregular. Additionally, or alternatively, the measured average intensities for each fiber ID may be compared to an accepted range for that fiber ID specified with the accepted range data structure 164 of empirically determined ranges to determine whether the measured intensities are within the determined ranges for the corresponding time and weld location. Further, while the range of 1000 nm is used as an example wavelength range for comparison in this example, implementations herein are limited to a particular wavelength range.

The example processes described herein are only examples of processes provided for discussion purposes. Numerous other variations will be apparent to those of skill in the art in light of the disclosure herein. Additionally, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, methods, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:
1. A system comprising:
   a welding tool for performing welding, the welding tool including a plurality of optical fibers positioned for receiving electromagnetic radiation from a weld area;
   an optical signal receiving apparatus for receiving optical signals from the optical fibers during welding and generating optical signal information;

a computing device including one or more processors programmed by executable instructions to perform operations comprising:
receiving the optical signal information based on respective optical signals received through the plurality of optical fibers during welding;
comparing the optical signal information corresponding to a first one of the optical fibers with the optical signal information corresponding to a second one of the optical fibers;
based on the comparing, determining whether the welding is irregular; and
performing at least one action based on whether the welding is irregular; and
a welder controller, wherein performing at least one action further comprises sending a signal to the welder controller based on determining that the welding is irregular to at least one of:
cause the welder controller to change a welding parameter for an arc generated by the welding tool; or
cause the welder controller to change a position of the welding tool with respect to a workpiece.

2. The system as recited in claim 1, wherein the optical fibers are positioned for receiving the electromagnetic radiation from at least one of a melt pool, a weld bead, or a welding arc in the weld area.

3. The system as recited in claim 1, wherein the operation of performing at least one action further comprises sending a notification to an operator associated with the welding tool.

4. The system as recited in claim 1, wherein comparing the optical signal information corresponding to a first one of the optical fibers with the optical signal information corresponding to a second one of the optical fibers comprises:
comparing a first infrared electromagnetic radiation signal intensity indicated through the first optical fiber with a second infrared electromagnetic radiation signal intensity indicated through the second optical fiber; and
determining that an arc formed by the welding tool is irregular based on the first infrared electromagnetic radiation signal intensity differing from the second infrared electromagnetic radiation signal intensity by a threshold amount.

5. The system as recited in claim 1, wherein comparing the optical signal information corresponding to a first one of the optical fibers with the optical signal information corresponding to a second one of the optical fibers comprises:
comparing a first ultraviolet and/or visible light electromagnetic radiation signal intensity indicated through the first optical fiber with a second ultraviolet and/or visible light electromagnetic radiation signal intensity indicated through the second optical fiber; and
determining that a weld geometry formed during the welding is irregular based on the first ultraviolet and/or visible light electromagnetic radiation signal intensity differing from the second ultraviolet and/or visible light electromagnetic radiation signal intensity by a threshold amount.

6. The system as recited in claim 1, wherein:
the welding tool comprises a welding electrode; and
there are a minimum of three optical fibers symmetrically positioned around the welding electrode for receiving the electromagnetic radiation from the weld area.

7. A system comprising:
a welding tool including a nozzle and a welding electrode extending through a nozzle opening of the nozzle;
a plurality of optical fibers disposed around the welding electrode and positioned to receive electromagnetic radiation from a weld area during welding; and
a computing device including one or more processors programmed by executable instructions to perform operations comprising:
during welding, comparing optical signal information corresponding to a first one of the optical fibers with optical signal information corresponding to a second one of the optical fibers for determining whether the welding is irregular; and
performing at least one action based on whether the welding is irregular; and
an optical signal receiving apparatus, wherein the plurality of optical fibers are connected to the optical signal receiving apparatus, the optical signal receiving apparatus configured to provide optical signal information to the computing device based on optical signals received through the plurality of optical fibers.

8. The system as recited in claim 7, wherein:
the welding tool includes a collet supporting the welding electrode within the nozzle; and
one or more of the optical fibers are disposed in or on the collet inside the nozzle of the welding tool.

9. The system as recited in claim 7, wherein the nozzle is conical and one or more of the optical fibers are mounted on a conical portion of the nozzle at least one of inside the nozzle or on an exterior of the nozzle.

10. The system as recited in claim 7, wherein there are a minimum of three optical fibers disposed around the welding electrode.

11. The system as recited in claim 7 wherein the optical signal receiving apparatus includes at least one of:
a plurality of spectrometers for receiving respective optical signals from respective ones of the plurality of optical fibers, the plurality of spectrometers configured to generate the optical signal information from the respective optical signals and provide the optical signal information to the computing device; or
a plurality of beam splitters connected to the plurality of optical fibers for receiving respective optical signals from respective ones of the plurality of optical fibers, an providing optical signals to one or more electromagnetic radiation filters associated with respective electromagnetic radiation sensors configured to generate the optical signal information from the respective optical signals and provide the optical signal information to the computing device.

12. A system comprising:
a welding tool including a nozzle and a welding electrode extending through a nozzle opening of the nozzle;
a plurality of optical fibers disposed around the welding electrode and positioned to receive electromagnetic radiation from a weld area during welding; and
a computing device including one or more processors programmed by executable instructions to perform operations comprising:
during welding, comparing optical signal information corresponding to a first one of the optical fibers with optical signal information corresponding to a second one of the optical fibers for determining whether the welding is categorized as irregular based on:
determining that an arc formed by the welding tool is irregular based on a first infrared electromagnetic radiation signal intensity from the first optical fiber differing by a threshold amount from a second infrared electromagnetic radiation signal intensity from the second optical fiber; and determining that a weld geometry formed during the welding is irregular based on a first ultraviolet and/or visible light electromagnetic radiation signal intensity from the first optical fiber differing by a threshold amount from a second ultraviolet and/or visible light electromagnetic radiation signal intensity from the second optical fiber; and performing at least one action based on whether the welding is categorized as irregular.

13. The system as recited in claim 12, wherein there are a minimum of three optical fibers disposed around the welding electrode.

14. The system as recited in claim 12, wherein:
the welding tool includes a collet supporting the welding electrode within the nozzle; and
one or more of the optical fibers are disposed in or on the collet inside the nozzle of the welding tool.

15. The system as recited in claim 12, wherein the nozzle is conical and one or more of the optical fibers are mounted on a conical portion of the nozzle at least one of inside the nozzle or on an exterior of the nozzle.

16. The system as recited in claim 12, further comprising an optical signal receiving apparatus, wherein the plurality of optical fibers are connected to the optical signal receiving apparatus, the optical signal receiving apparatus configured to provide optical signal information to the computing device based on optical signals received through the plurality of optical fibers.

17. The system as recited in claim 16, wherein the optical signal receiving apparatus includes at least one of:
a plurality of spectrometers for receiving respective optical signals from respective ones of the plurality of optical fibers, the plurality of spectrometers configured to generate the optical signal information from the respective optical signals and provide the optical signal information to the computing device; or a plurality of beam splitters connected to the plurality of optical fibers for receiving respective optical signals from respective ones of the plurality of optical fibers, an providing optical signals to one or more electromagnetic radiation filters associated with respective electromagnetic radiation sensors configured to generate the optical signal information from the respective optical signals and provide the optical signal information to the computing device.

18. The system as recited in claim 1, wherein:
the welding tool includes a collet supporting a welding electrode within a nozzle; and
one or more of the optical fibers are disposed in or on the collet inside the nozzle of the welding tool.

19. The system as recited in claim 1, wherein:
the welding tool includes a conical nozzle; and
one or more of the optical fibers are mounted on a conical portion of the nozzle at least one of inside the nozzle or on an exterior of the nozzle.

* * * * *